(12) United States Patent
Tartaglia

(10) Patent No.: US 7,880,962 B2
(45) Date of Patent: Feb. 1, 2011

(54) OPTICAL AND INFRARED PERISCOPE WITH DISPLAY MONITOR

(76) Inventor: Robert Tartaglia, 3 W. Beech St., Islip, NY (US) 11735

( * ) Notice: Subject to any disclaimer, the term of this patent is extended or adjusted under 35 U.S.C. 154(b) by 41 days.

(21) Appl. No.: 11/602,515

(22) Filed: Mar. 31, 2006

(65) Prior Publication Data

US 2007/0229943 A1 Oct. 4, 2007

(51) Int. Cl.
G02B 23/12 (2006.01)

(52) U.S. Cl. .................... 359/353; 359/399

(58) Field of Classification Search ......... 359/350–361, 359/399–432, 618, 368–390; 250/214 VT
See application file for complete search history.

(56) References Cited

U.S. PATENT DOCUMENTS

| | | | | |
|---|---|---|---|---|
| 4,922,092 A * | 5/1990 | Rushbrooke et al. | ... | 250/214 VT |
| 4,961,278 A * | 10/1990 | Johnson et al. | ............... | 42/122 |
| 5,035,472 A * | 7/1991 | Hansen | ...................... | 359/350 |
| 5,084,780 A * | 1/1992 | Phillips | ...................... | 359/350 |
| 5,282,082 A * | 1/1994 | Espie et al. | .................. | 359/353 |
| 5,943,163 A * | 8/1999 | Tartaglia | ..................... | 359/351 |
| 6,262,768 B1* | 7/2001 | Williams | ................. | 348/217.1 |
| 6,798,578 B1* | 9/2004 | Beystrum et al. | ............ | 359/630 |
| 7,158,296 B1* | 1/2007 | Schwartz et al. | ............. | 359/407 |
| 2003/0093805 A1* | 5/2003 | Gin | ............................. | 725/105 |
| 2005/0092923 A1* | 5/2005 | Fantone et al. | .............. | 250/330 |
| 2007/0013997 A1* | 1/2007 | Zadravec et al. | ............ | 359/353 |
| 2007/0228259 A1* | 10/2007 | Hohenberger | ......... | 250/214 LA |

FOREIGN PATENT DOCUMENTS

JP 11-64739 * 3/1999 ................ 359/402

* cited by examiner

*Primary Examiner*—Thong Nguyen
(74) *Attorney, Agent, or Firm*—Thomas A. O'Rourke; Bodner & O'Rourke, LLP

(57) ABSTRACT

The present invention includes a periscope, which has two camera objectives. The cameras are housed on top of the viewing monitor inside of a housing cell, so as to efficiently utilize the cabin space of the vehicle. One camera objective is a day camera bullet that may be used during day time or low light viewing. Another camera objective is the night board camera that may be used for night time viewing. Both cameras are electronically connected to a flat panel display, so that the optical picture may be displayed by others. In addition, the periscope of the present invention utilizes a heater sensor system that allows the day or night camera to be operated at or below temperatures of 32° Fahrenheit. The periscope of the present invention also implements an 18 mm image intensifier tube, which has the capability of detecting and amplifying low light level images during night time viewing and surveillance, under moonlight or starlight.

39 Claims, 29 Drawing Sheets

OPTICAL AND INFRARED PERISCOPE WITH DISPLAY MONITOR

FIELD OF INVENTION

Figure 1:
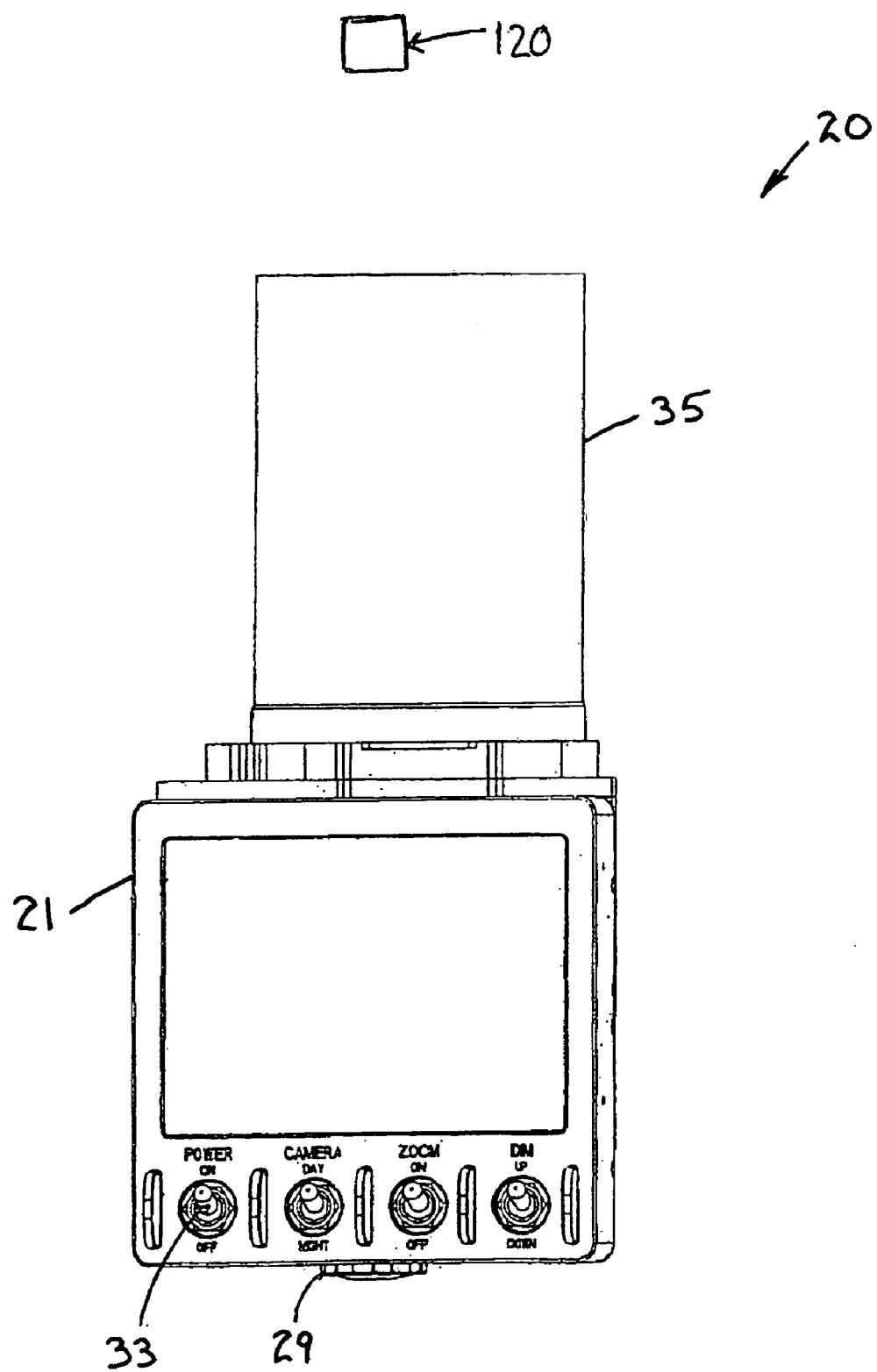

The present invention relates to an improved optical image forming apparatus and more particularly to a periscope system that allows for day and night imagery which includes a low light day system, coupled with a high resolution flat panel display.

BACKGROUND OF THE INVENTION

Periscopes are optical instruments for conducting observations from a concealed or protected position. A simple periscope consists essentially of reflecting mirrors or prisms at opposite ends of a tube with the reflecting surfaces parallel to each other, and at a 45° angle to the axis of the tube. The so-called field or tank periscope has been commonly used in trenches, behind parapets and earthworks, and in tanks to provide protected vision for the user. Periscopes are also used as viewing devices in military aircraft, in nuclear physics laboratories to observe radioactive reactions, and in particle accelerators.

The physics behind periscope operation, as mentioned above, is based on principles of light reflection and has been implemented for many years. Light always reflects away from a mirror at the same angle that it hits the mirror. As mentioned previously, a simple periscope consists essentially of reflecting mirrors or prisms at opposite ends of a tube with the reflecting surfaces parallel to each other, and at a 45° angle to the axis of the tube. With this periscope configuration, light hits the top mirror at a 45° angle and reflects away at the same angle, which bounces it down to the bottom mirror. That reflected light hits the second mirror at a 45° angle and reflects away at the same angle, right into your eye. One such periscope configuration is U.S. Pat. No. 3,454,222 owned by United States of America, as represented by the Secretary of the Army. In that invention the periscope utilized a catadioptric system for night periscope sight. Another such periscope, also owned by the United States of America, as represented by the Secretary of the Army, is U.S. Pat. No. 3,549,231, a lens prescription for an optical system for day and night periscope sight. In these early periscope configurations the images are observed via the reflective characteristics of the mirrors along with their positions relative to each other. However, these earlier periscope configurations had very limited image production and night time viewing capabilities.

With the advancement of optical technology periscopes became more and more advanced as well. Night time image viewing capabilities improved, whether of the lens switching type, side by side sensor systems type, or the aperture sharing systems type; however these refractive optical systems had their disadvantages too. The lens switching system required the use of additional manpower, or bulky expensive mechanical or electromechanical lens switching mechanisms, requiring the attention of the operator for the lens selection. The side by side sensor systems required boresighting both of them on a common elevation or azimuth or both using optics such as a head mirror or a prism. The resulting structure is large, complicated, and expensive to manufacture, repair and maintain. The aperture sharing systems have increased substantially the system diameter which complicates stabilization of the system and adds to the size and the cost of the system, especially in a panoramic periscope where 360 degrees of azimuth coverage is required and the torquers, resolvers, and slip-ring assemblies become large. One such aperture sharing system with typical lens switching for covering wide chromatic bandwidths U.S. Pat. No. 4,260,217.

The assignee of the present invention, Selectron, currently sells the commander periscope, model M-36, U.S. Pat. No. 5,943,163, the disclosures of which are herein incorporated by reference, which provides a dual band periscope, which provides side-by-side imaging of an optical field of view in the visible light spectral band and the 3 to 5 micron spectral band; a 35° prism was used to accomplish this. The prism has a first portion that reflects and refracts light in the visible range. This visible light region consists of a spectrum of wavelengths, which range from approximately 700 nanometers (abbreviated nm) to approximately 400 nm; that would be $7 \times 10^{-7}$ m to $4 \times 10^{-7}$ m. The second portion of the prism reflects and refracts light in the infrared range of the light spectrum. Infrared light lies between the visible and microwave portions of the electromagnetic spectrum. Infrared light has a range of wavelengths, just like visible light has wavelengths that range from red light to violet. The second portion of the prism may be composed of optical grade silicon for refracting in the range of 3 microns to 5 microns. If the range of refraction desired was 8 microns to 12 microns then the second portion of the prism may be composed of optical grade germanium. A micron is the term commonly used in astronomy for a micrometer or one millionth of a meter. Portion one and portion two abut each other and are bonded at a juncture by an adhesive. The prism in that invention was allowed to pivot inside the housing so as enable the field of view to be changed.

In accordance with the invention, U.S. Pat. No. 5,943,163, visible light entering the window of the periscope is refracted and reflected by prism portion along a path into the optical viewing members contained in housing and eyepiece to provide conventional visible light observation. Infrared emissions, such as self-emissions of personnel and equipment, pass through the window and are refracted and reflected by the prism portion along infrared optical path, through the infrared focusing lens, onto an infrared detector, such as a focal plane array. The lower housing included the electronics required for processing the detected infrared image and provided a visible display of the image elements on a cathode ray tube for observation through the eyepiece. Remote viewing could also have been provided through a cable carrying the video image signal. The processing of the infrared image and display could have been controlled through control elements on the bottom of housing. The processing could have included electronic insertion of a reticule.

OBJECTS OF THE INVENTION

It is an object of the present invention to provide a periscope that is easy to manufacture and cost effective to produce.

It is an object of the present invention to provide a periscope that may be used with a variety of different types of vehicles.

It is another object of the present invention to provide a periscope where optical viewing may be achieved by one or many users.

It is still another object of the present invention to provide a periscope with a housing that is capable of containing all the advanced circuitry needed, and a housing that will not capture too much space, thus providing the viewer ample room to move.

It is still a further object of the present invention to transmit the images of both spectral bands to an improved high resolution flat panel display.

SUMMARY OF INVENTION

The present invention includes a periscope that allows for better day and night time viewing. In the present invention, visual imaging is dramatically improved through utilization of two specialized cameras; one particularly suited for day time viewing, the bullet camera, and one specially adapted for low light viewing, the night board camera. In addition, the periscope of the present invention utilizes an 18 mm image intensifier tube, which up until now, has never been used in periscopes. Generally, ANVIS, aviator's night vision imaging system, are primarily used in conjunction with goggles. The 18 mm image intensifier tube provides the present invention with the capability of detecting and amplifying low light level images during night time viewing and surveillance, under moonlight or starlight. In addition, for very low light levels the 18 mm image intensifier may be equipped with two or three microchannel plates to create an image by detecting single photons. Furthermore, one may implement a high speed gate with the 18 mm image intensifier tube to capture a fast event such as motion analysis of high speed moving objects and fluorescence lifetime imaging. The viewing panel of the present invention is a high resolution flat panel display, which has electronic reticles that are in focus at all ranges. The flat panel viewing screen is also fatigue free, which results in improved gunner performance. The present invention also implements cutting edge circuitry which maintains proper LCD and camera operation at temperatures at or below 32° Fahrenheit. The advanced circuitry compares on board temperatures to ambient temperatures, and when the temperature falls below a predetermined threshold temperature, small amounts of current are allowed to flow to around the optical viewing equipment. In addition, unlike previous periscopes, the present invention allows for viewing of the optical display via a state of the art flat panel screen, which as mentioned previously has electronically generated reticles always in focus. Furthermore, the optical display from the periscope may be viewed by others in real time, i.e. no time delay, via a video channel connection, which may be transmitted to others via radio transmission and or electronically, to another LCD, or other display apparatuses, such as a CRT, plasma T.V. or the like. The present invention also allows the user to take still shots from the display screen if desired. One may also implement a wide variety of overlays with the flat panel screen. The present invention also implements a state of the art laser range finder. In addition, the housing which contains most of the circuitry is smaller then prior art, thus allowing for an easier viewing environment. The decreased size of the housing is a result of more sophisticated electronic circuitry. The present invention is a necessary and much needed improvement for military personal, especially with the United States involvement overseas.

BRIEF DESCRIPTION OF INVENTION

Figure 2:
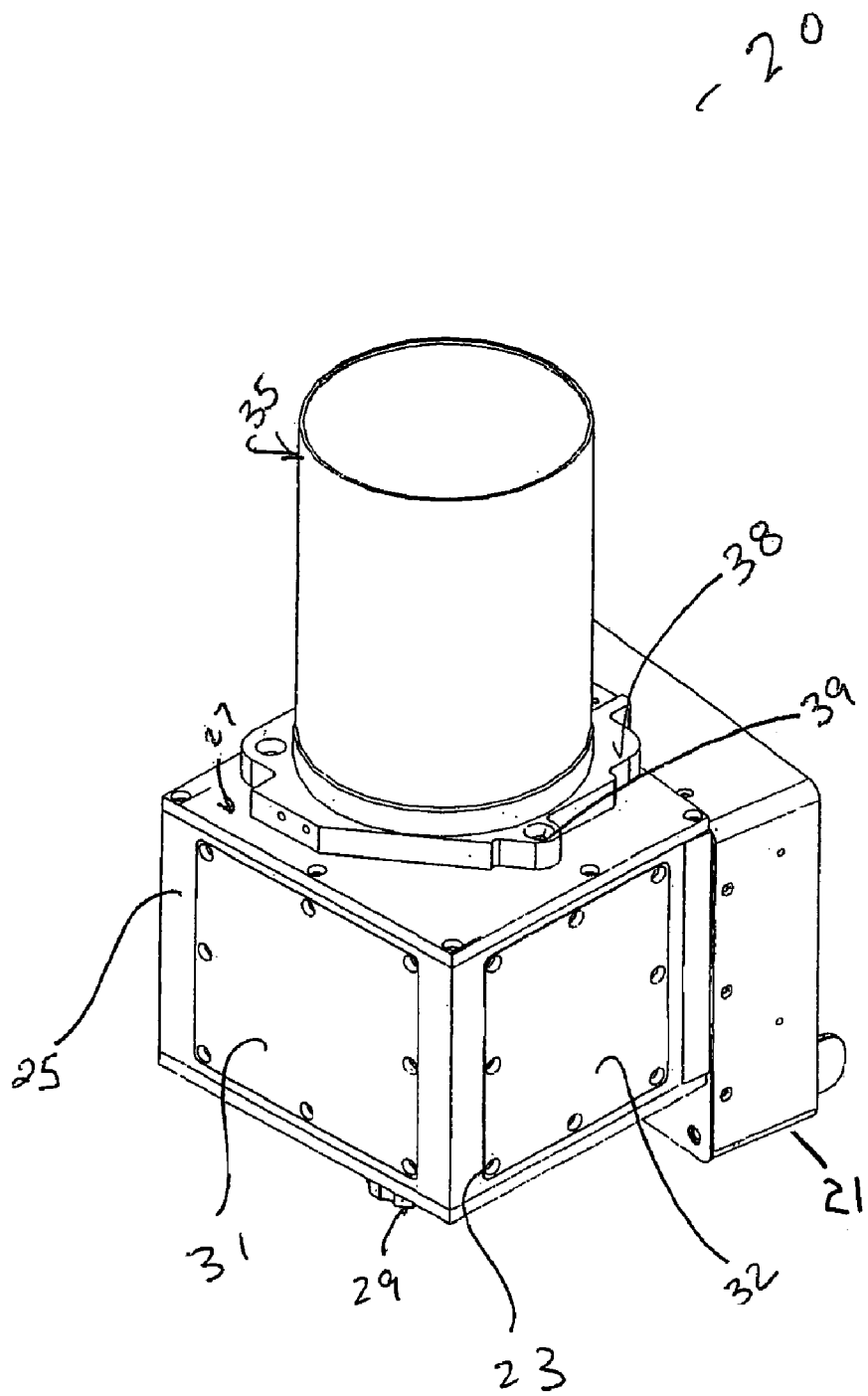
Figure 3:
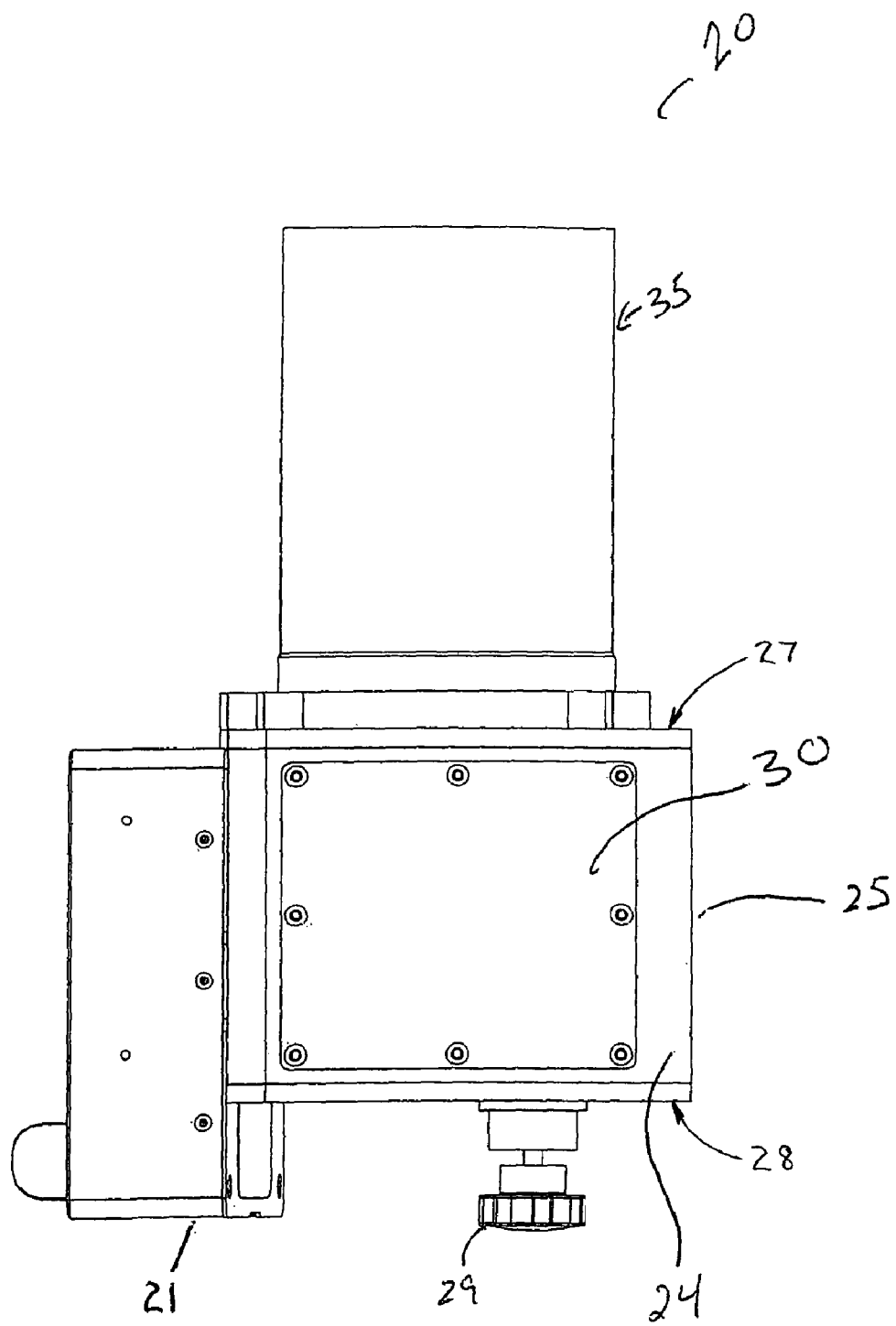
Figure 4:
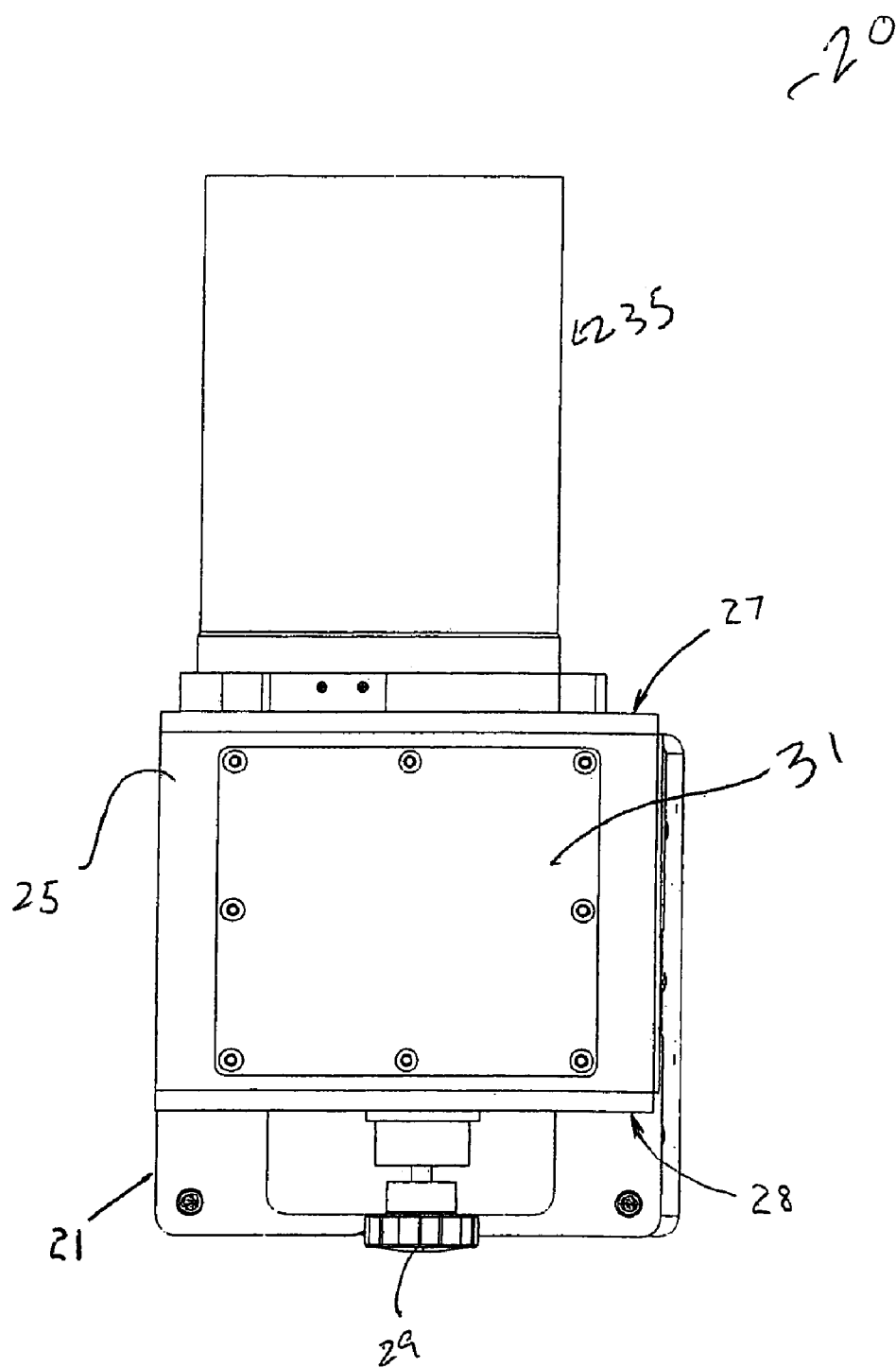
Figure 5:
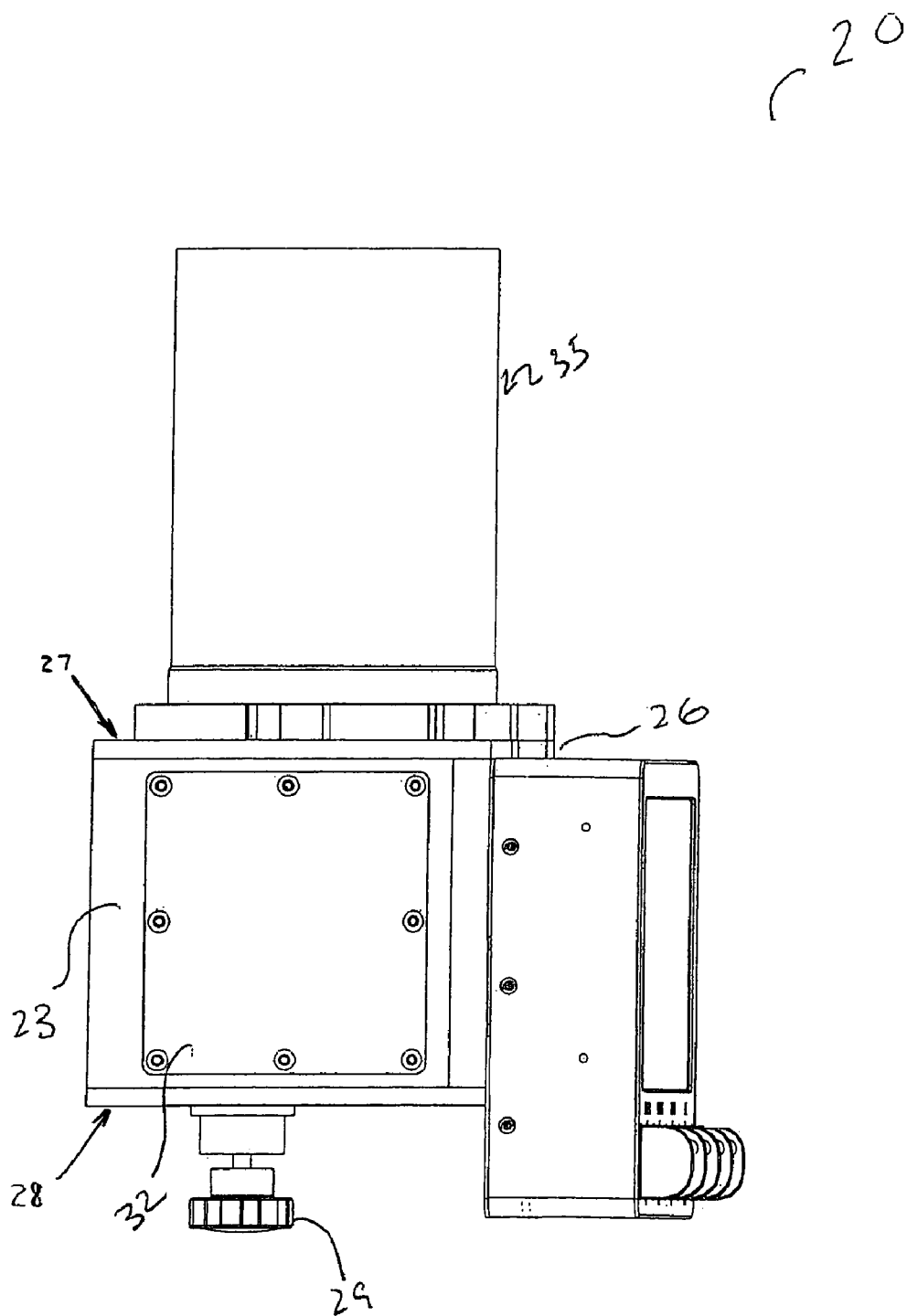
Figure 6:
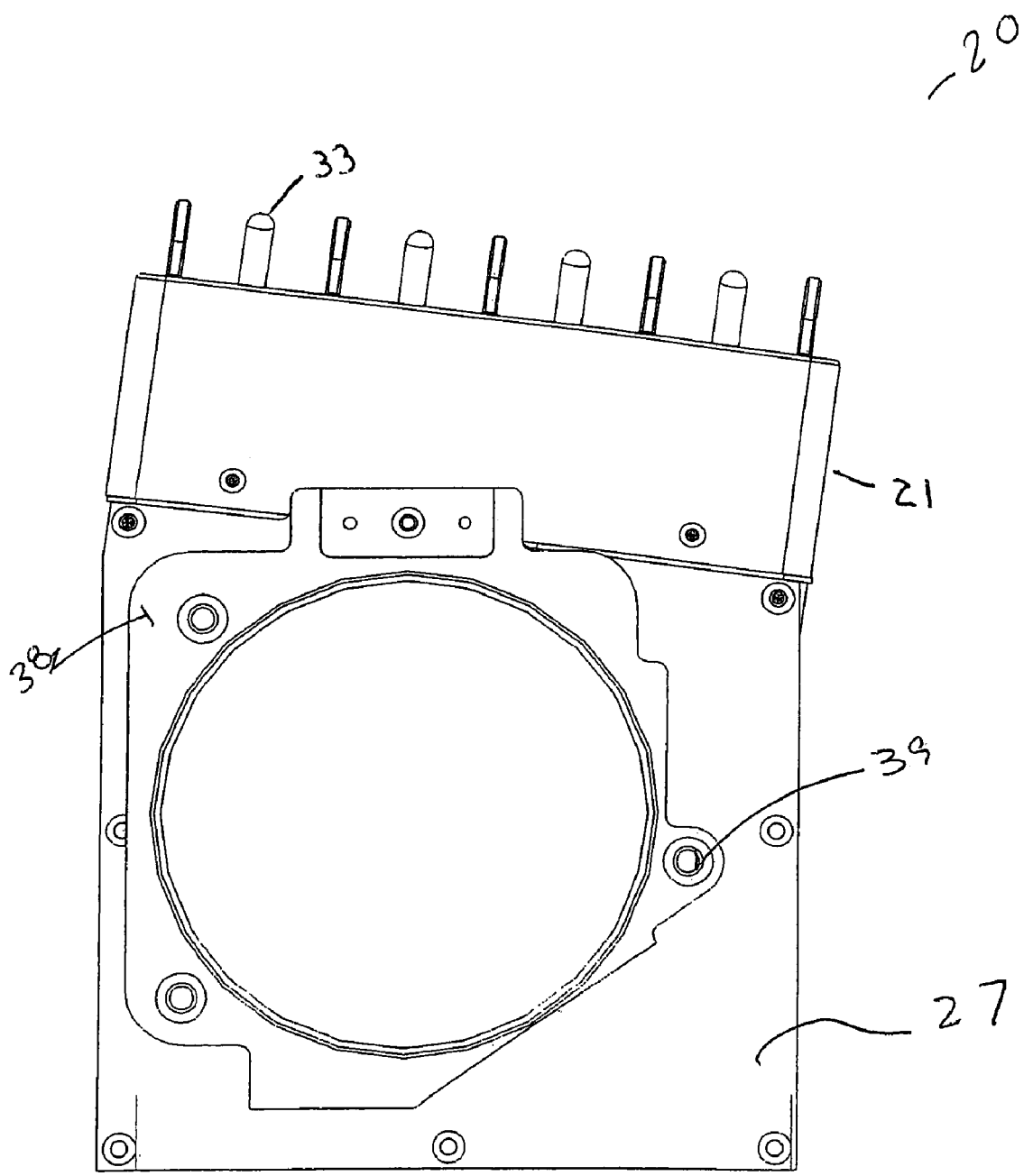
Figure 7:
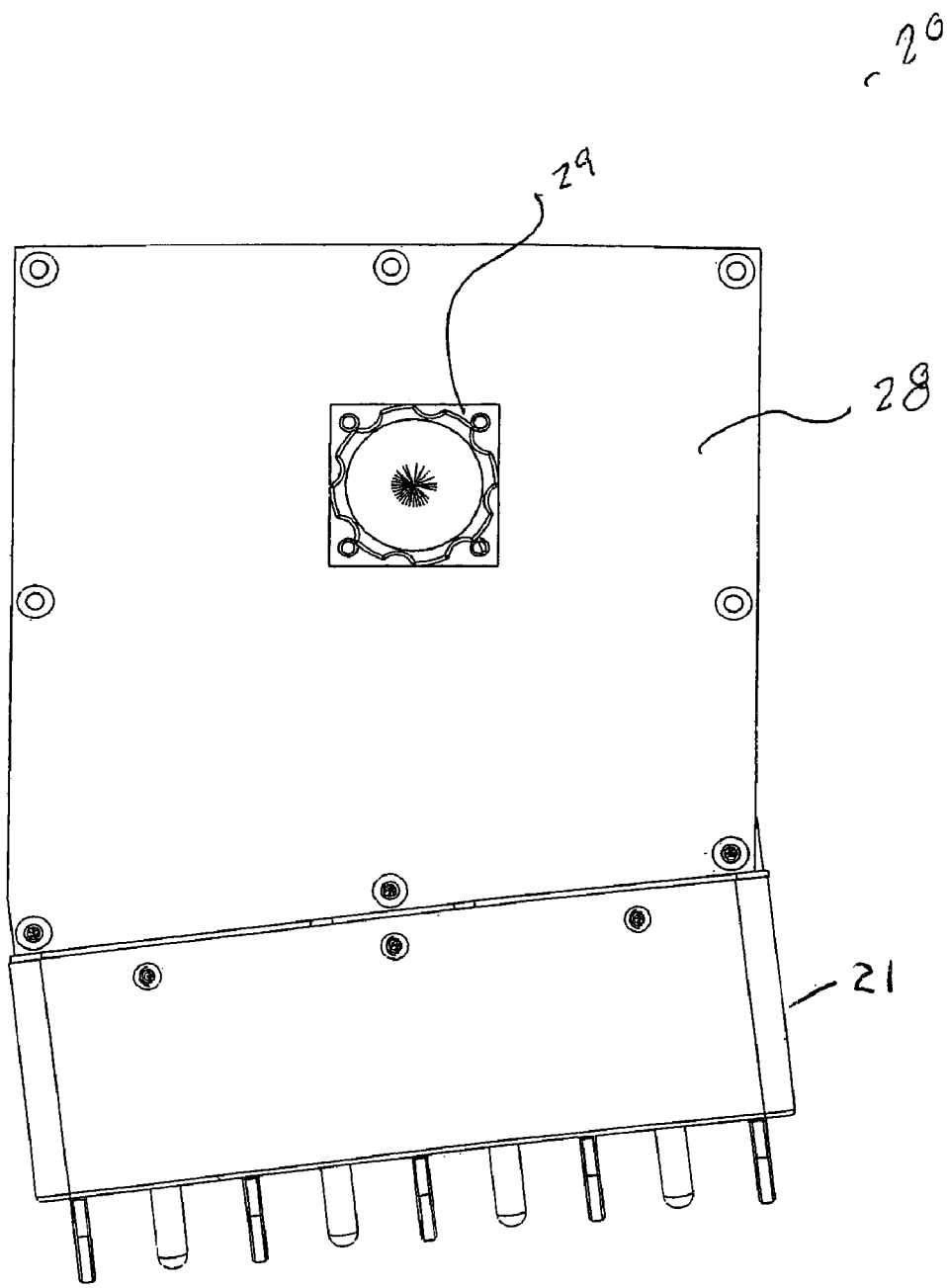
Figure 8:
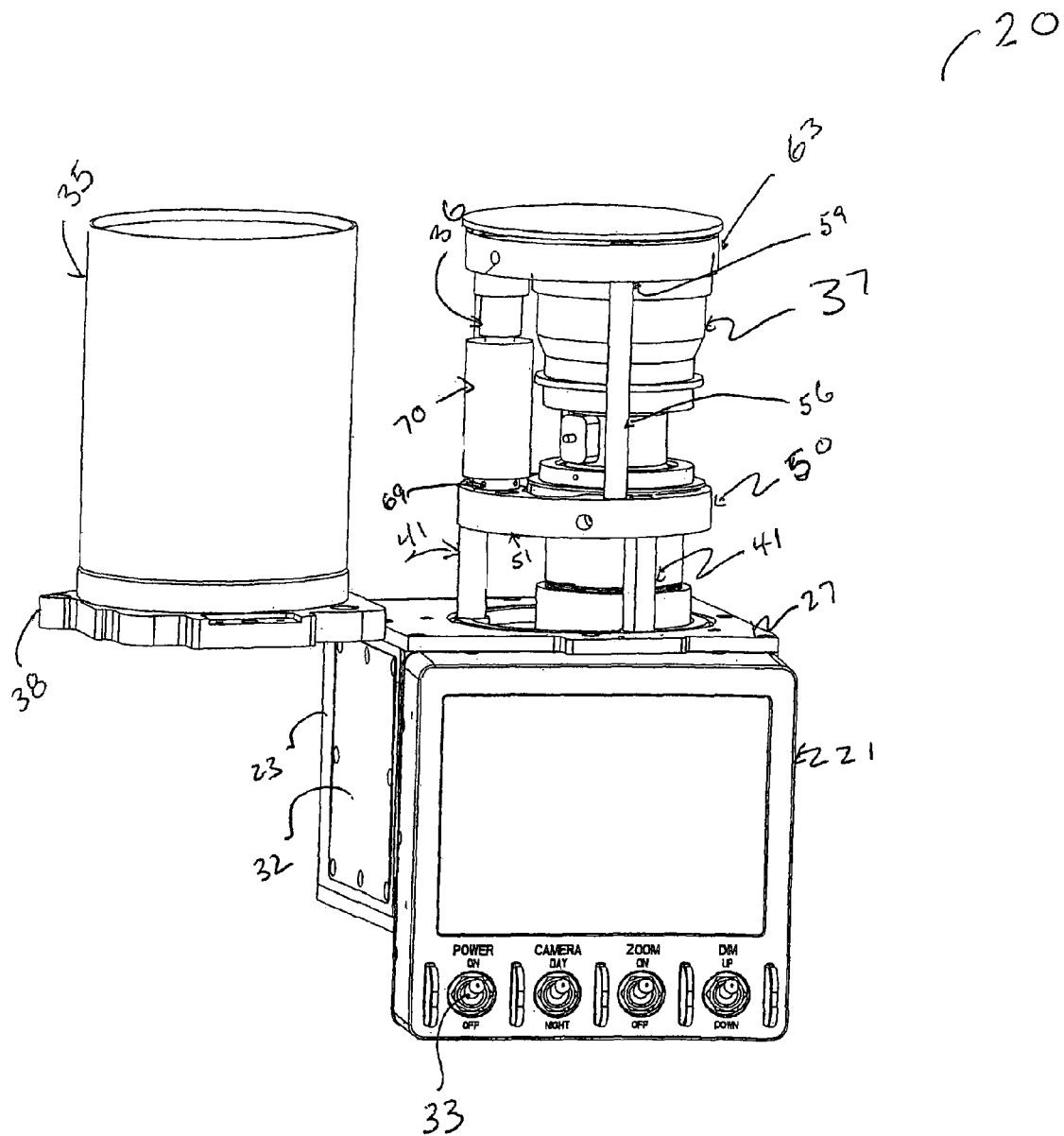
Figure 9:
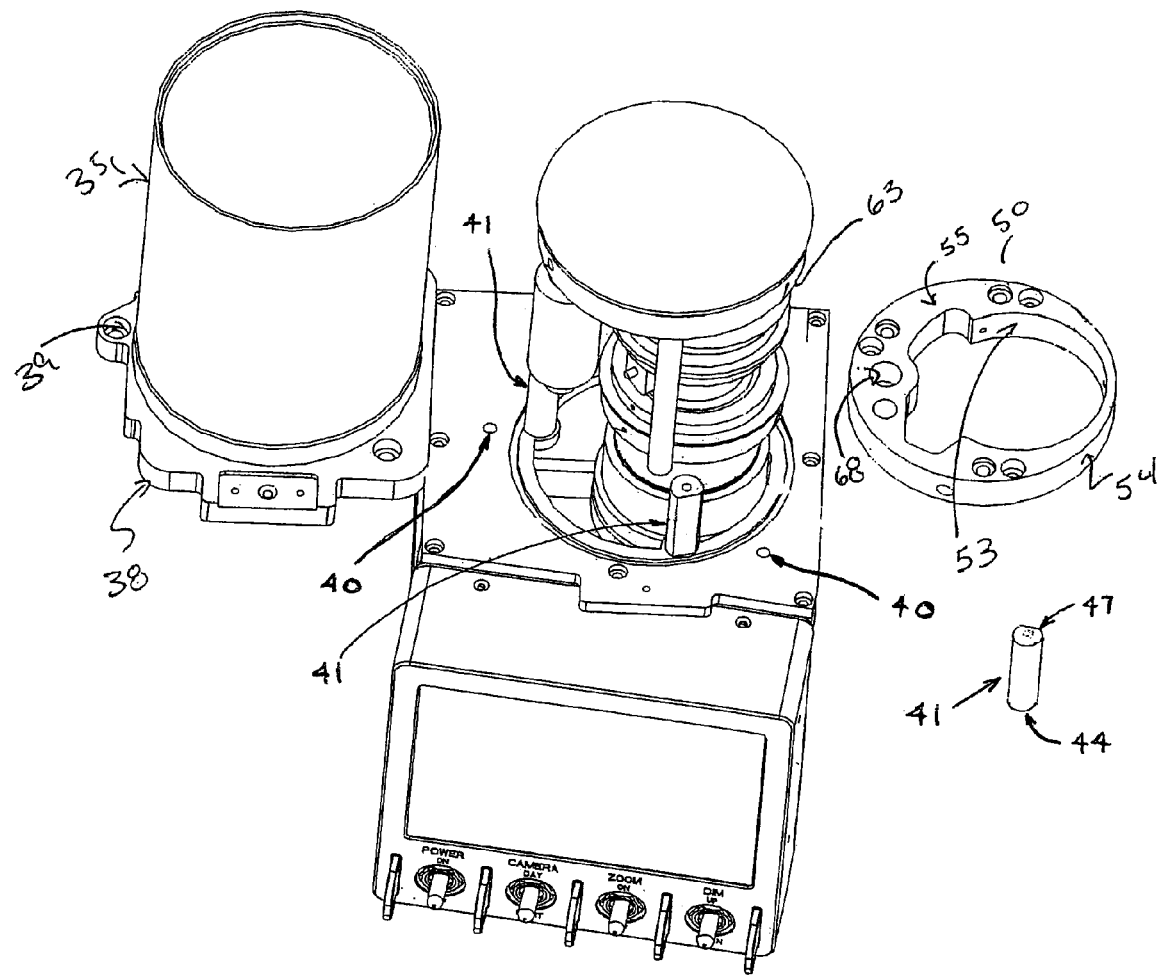
Figure 10:
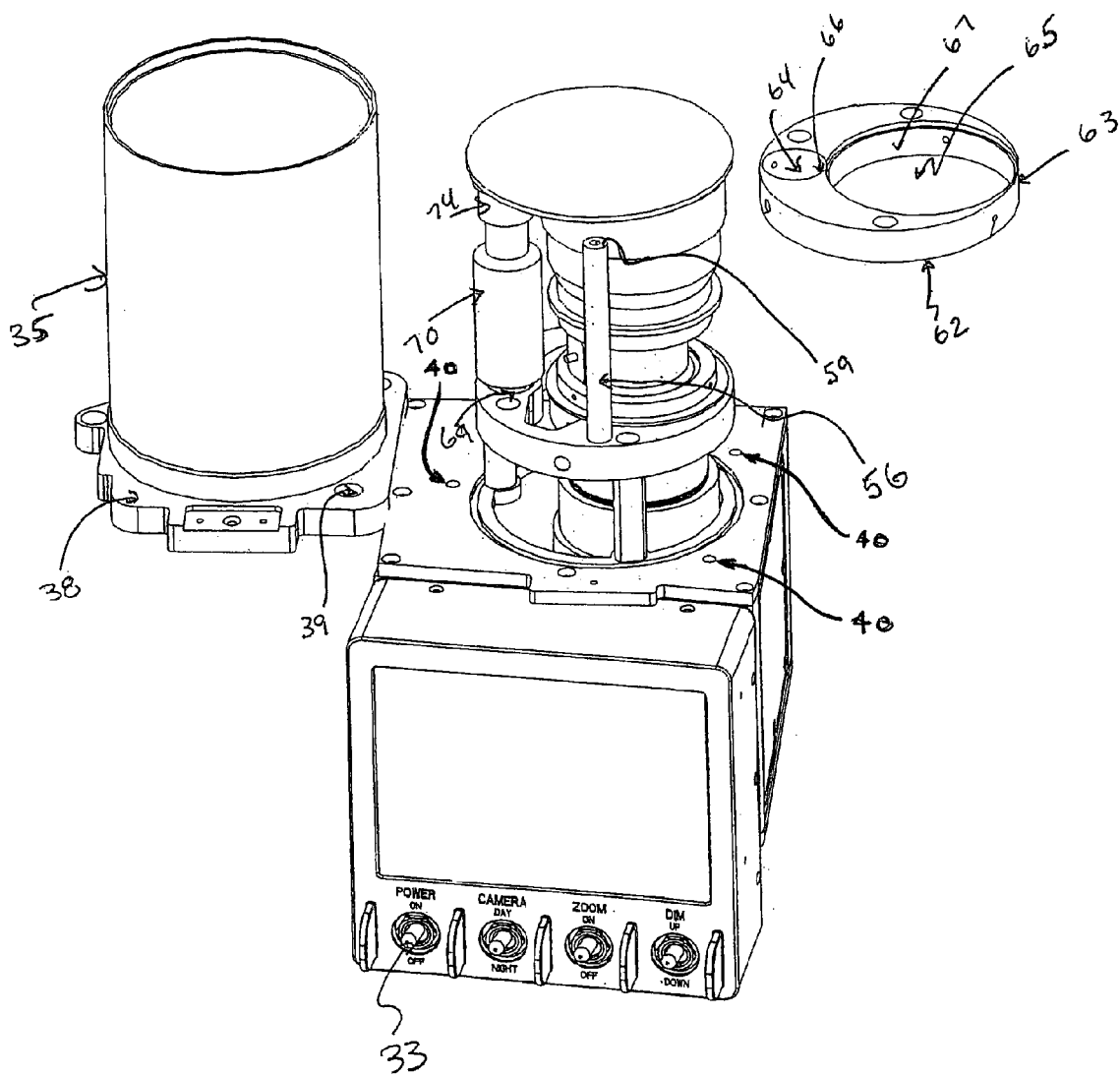
Figure 11:
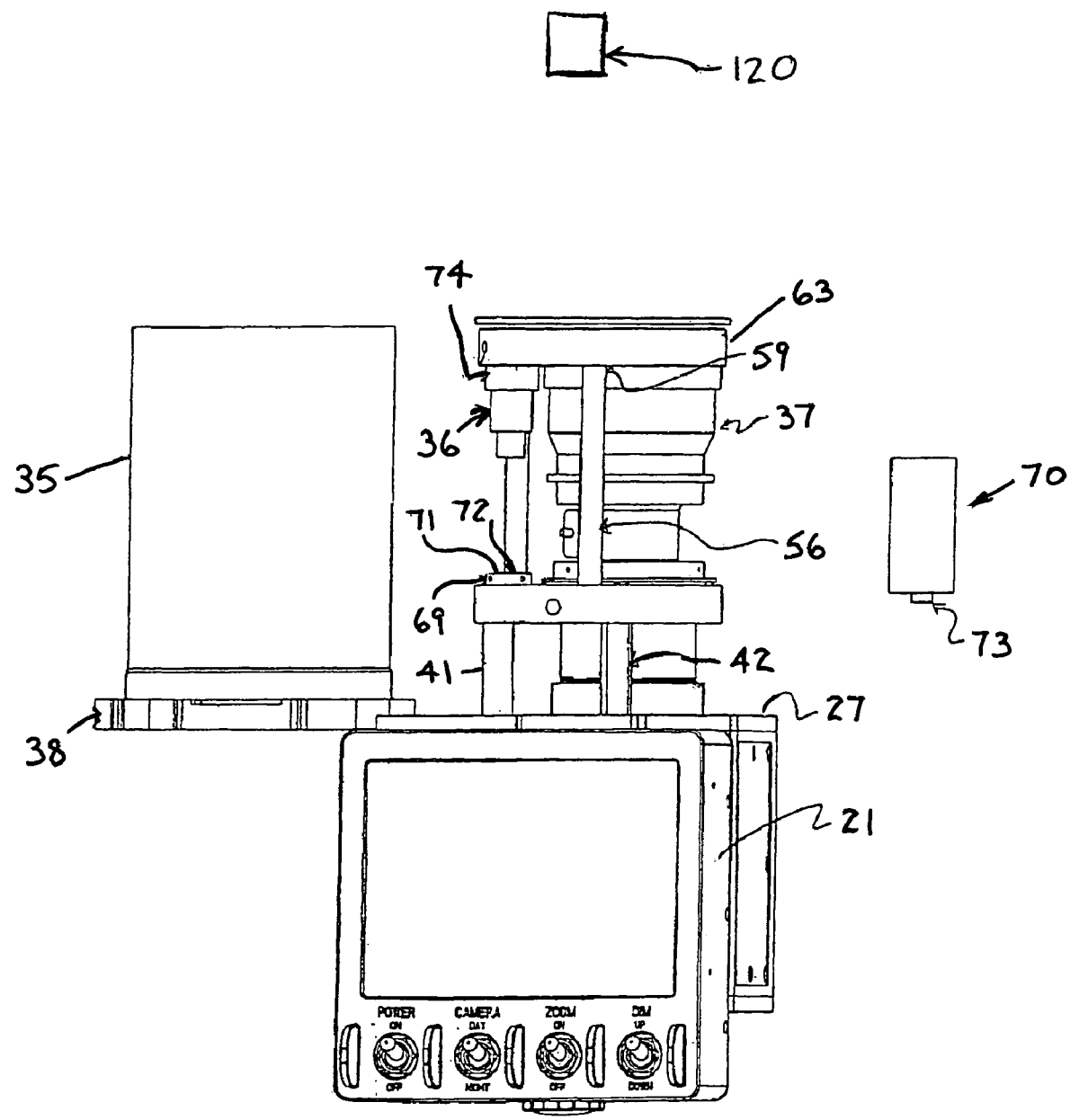
Figure 12:
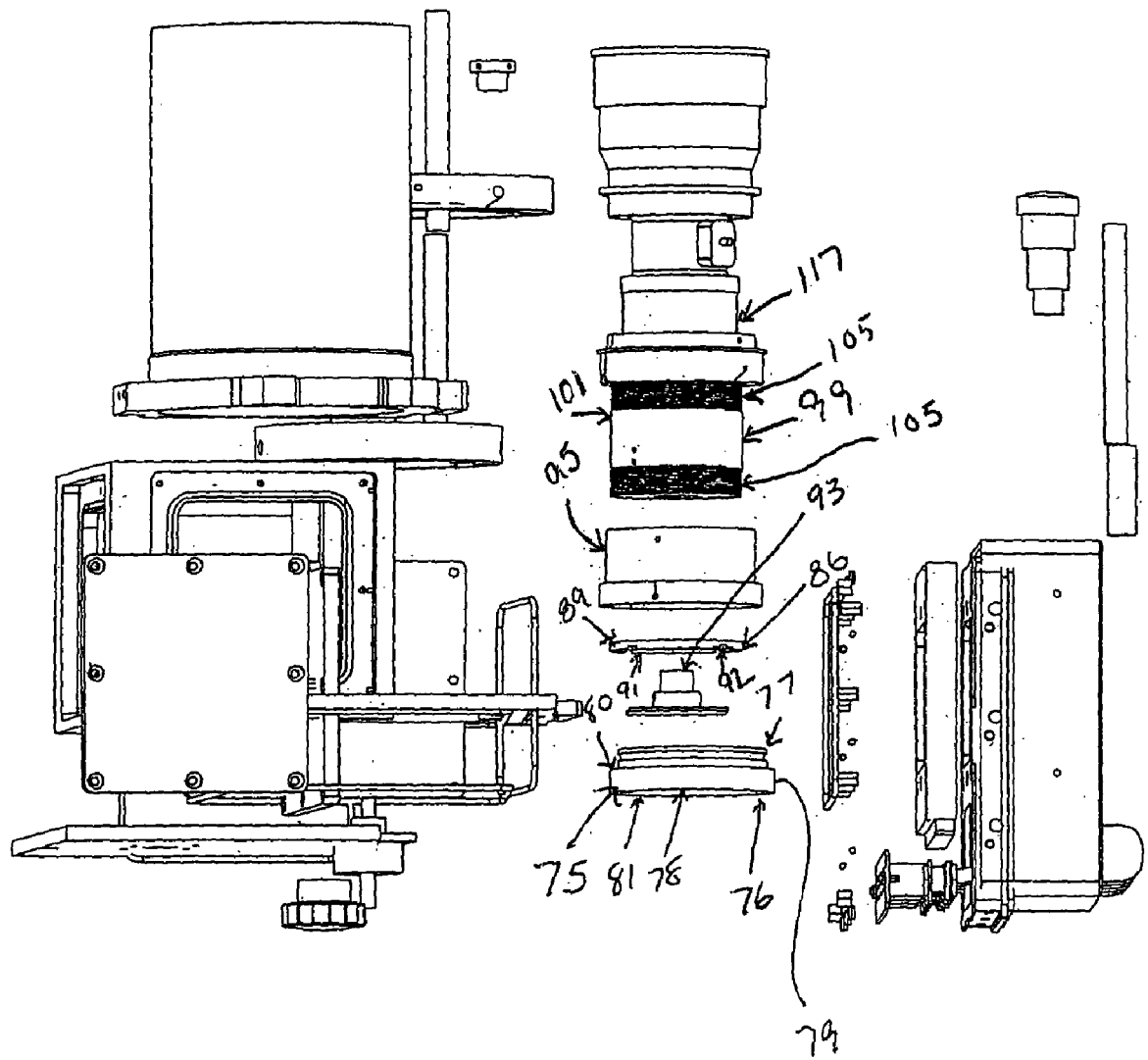
Figure 13:
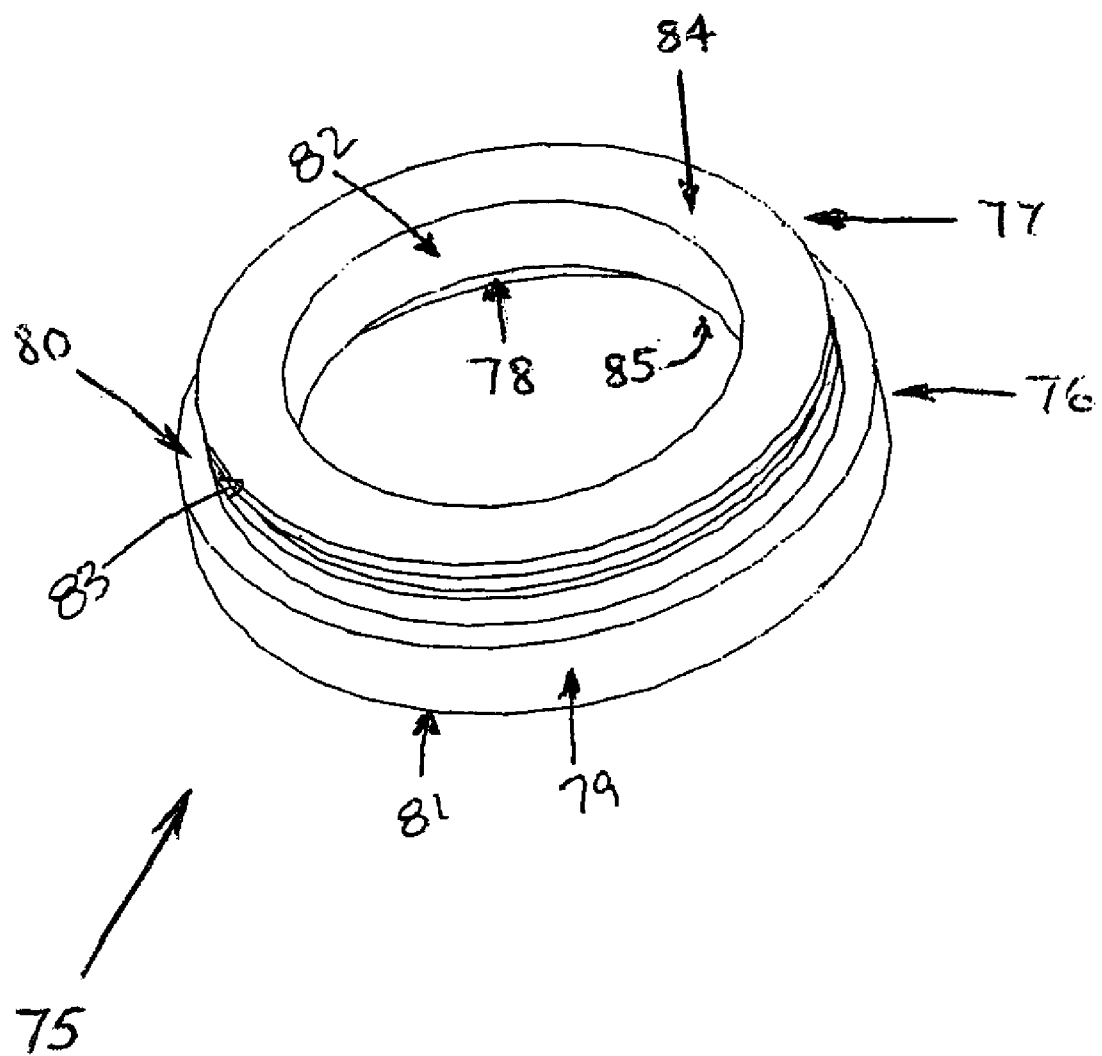
Figure 14:
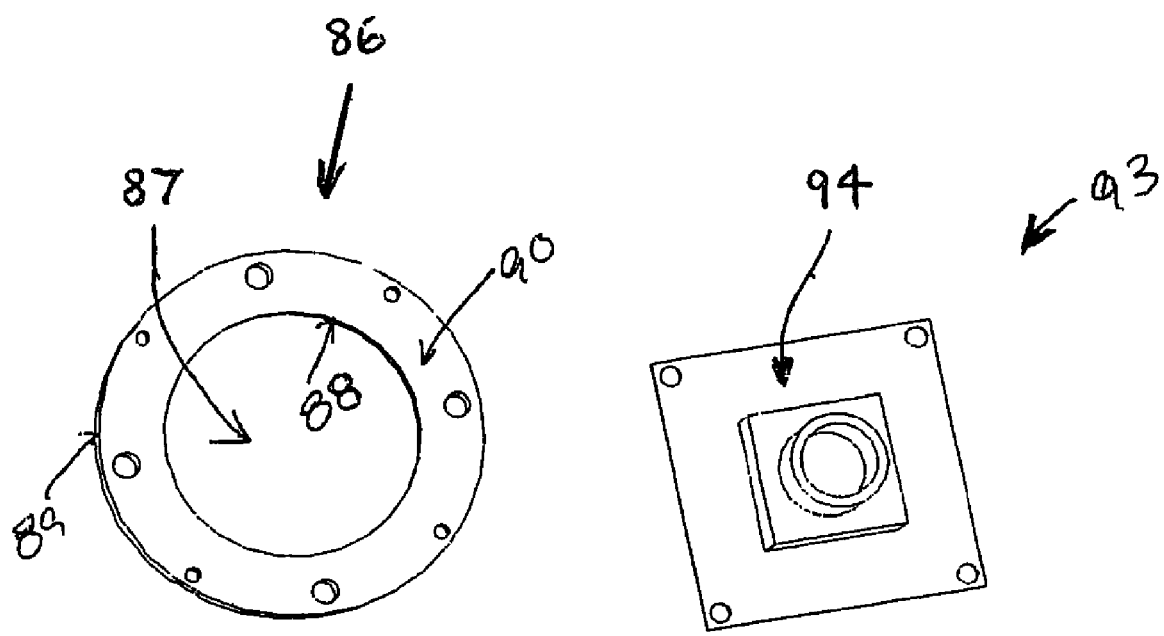
Figure 15:
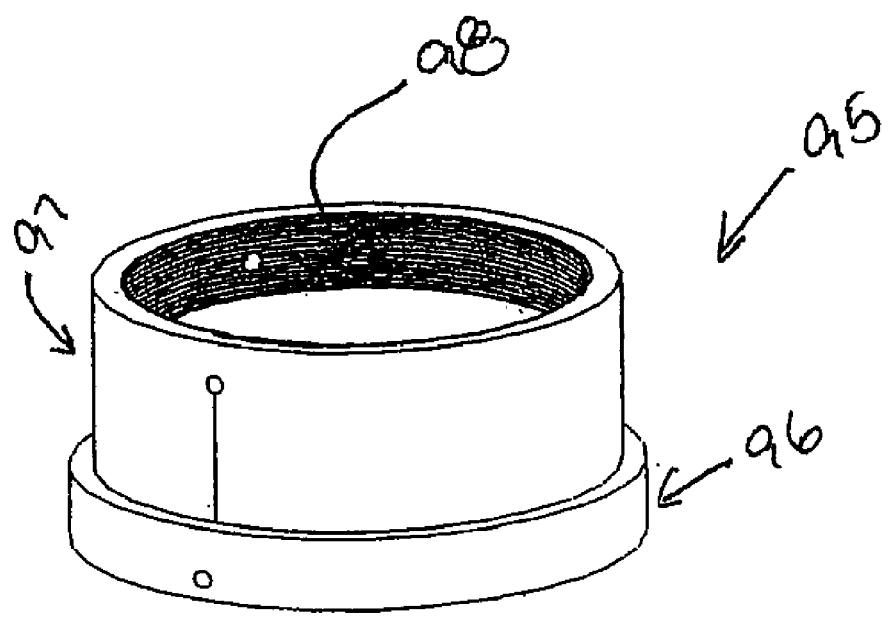
Figure 16:
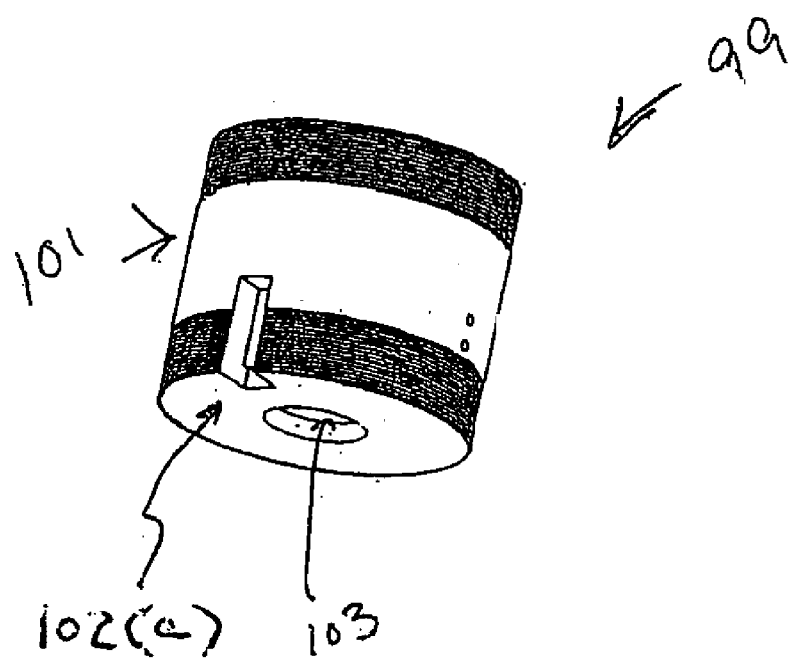
Figure 17:
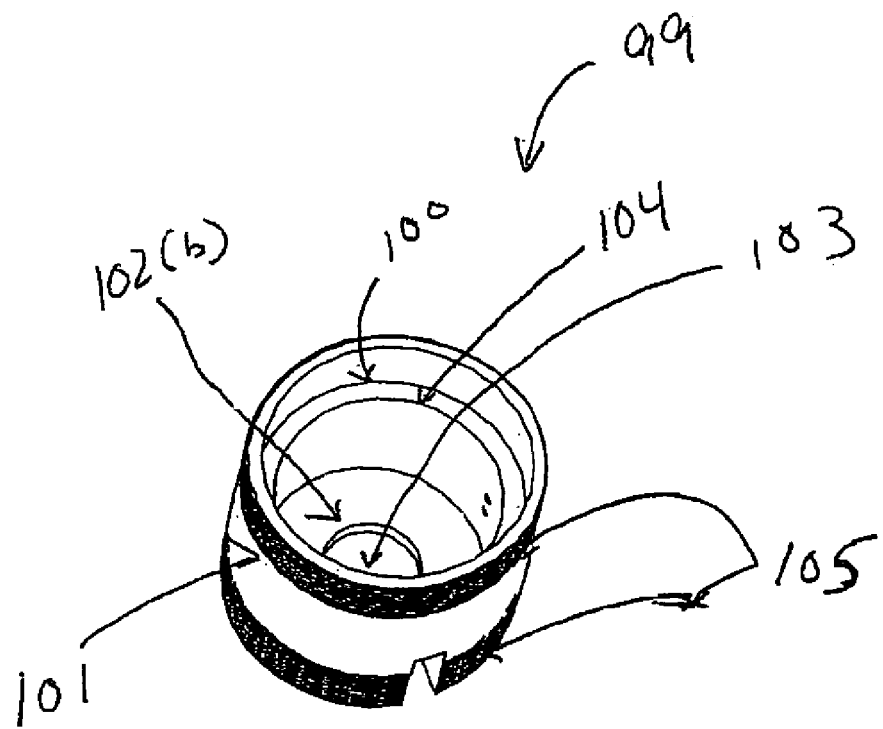
Figure 18:
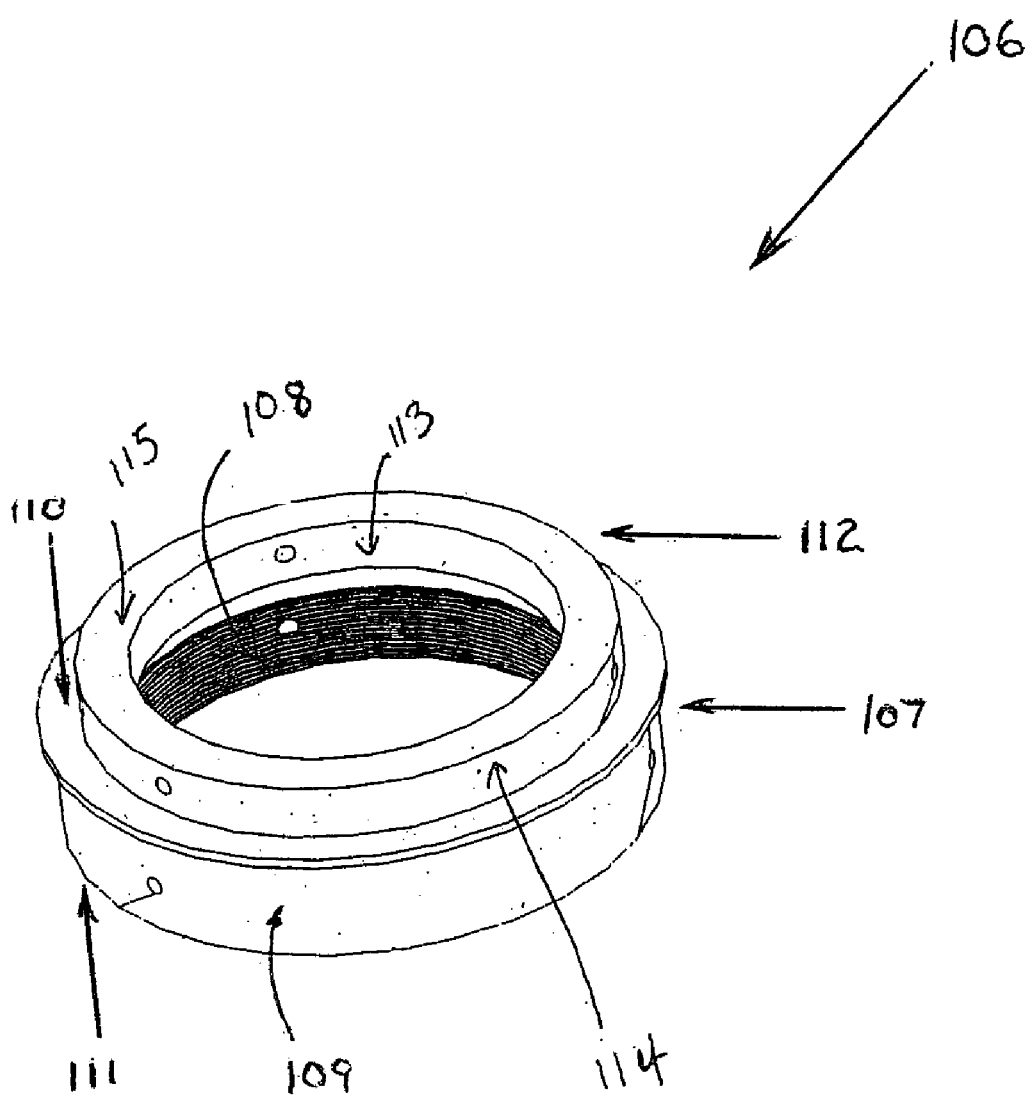
Figure 19:
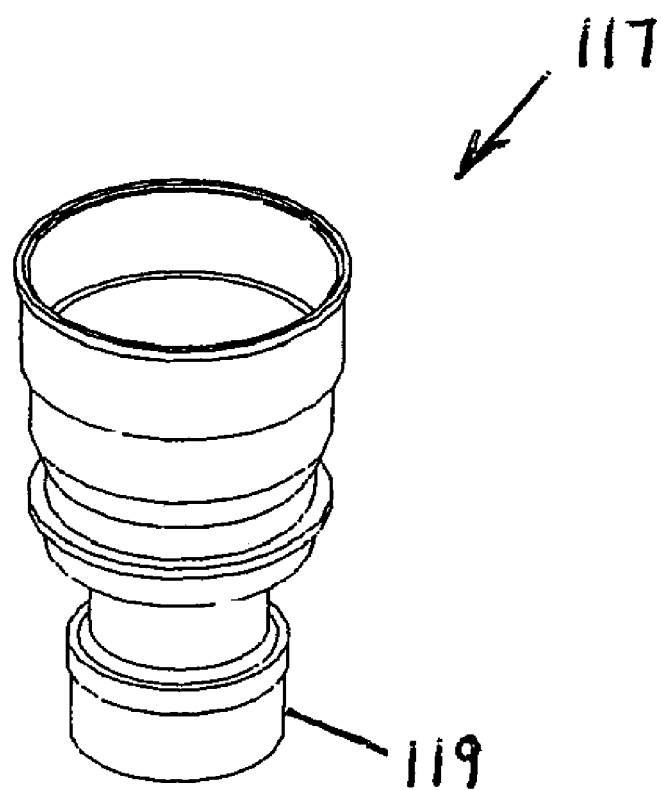
Figure 20:
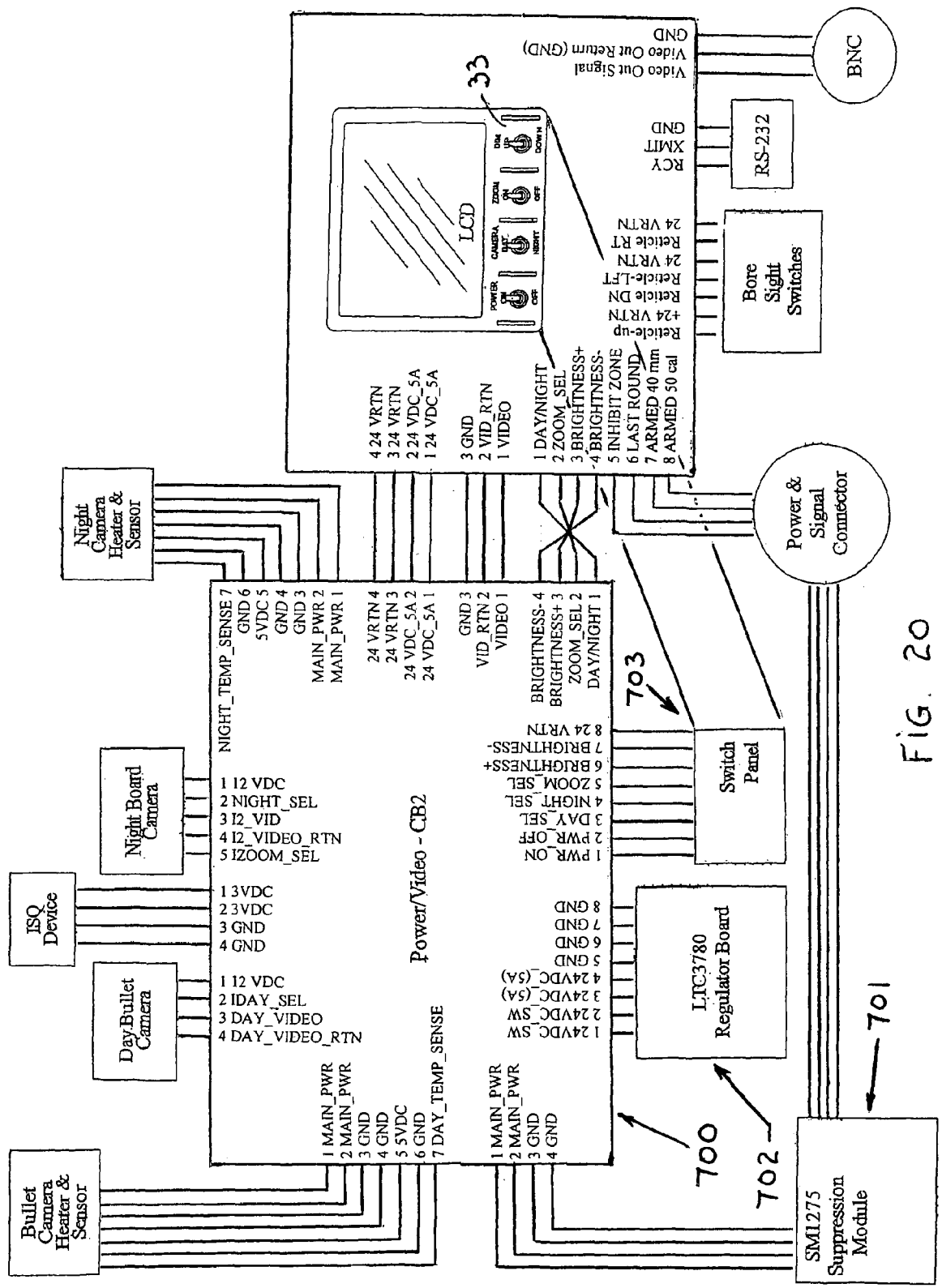
Figure 21:
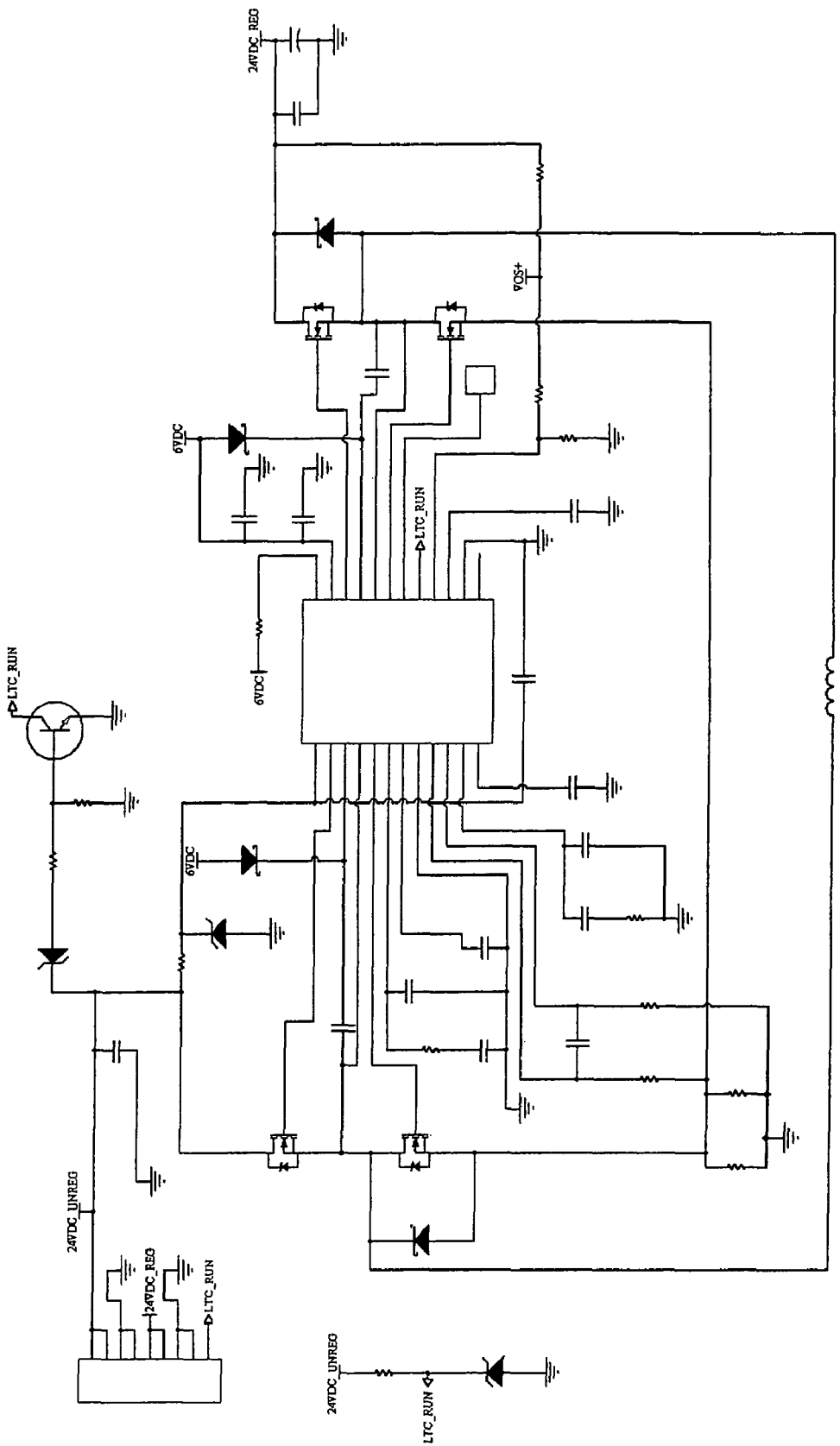
Figure 22:
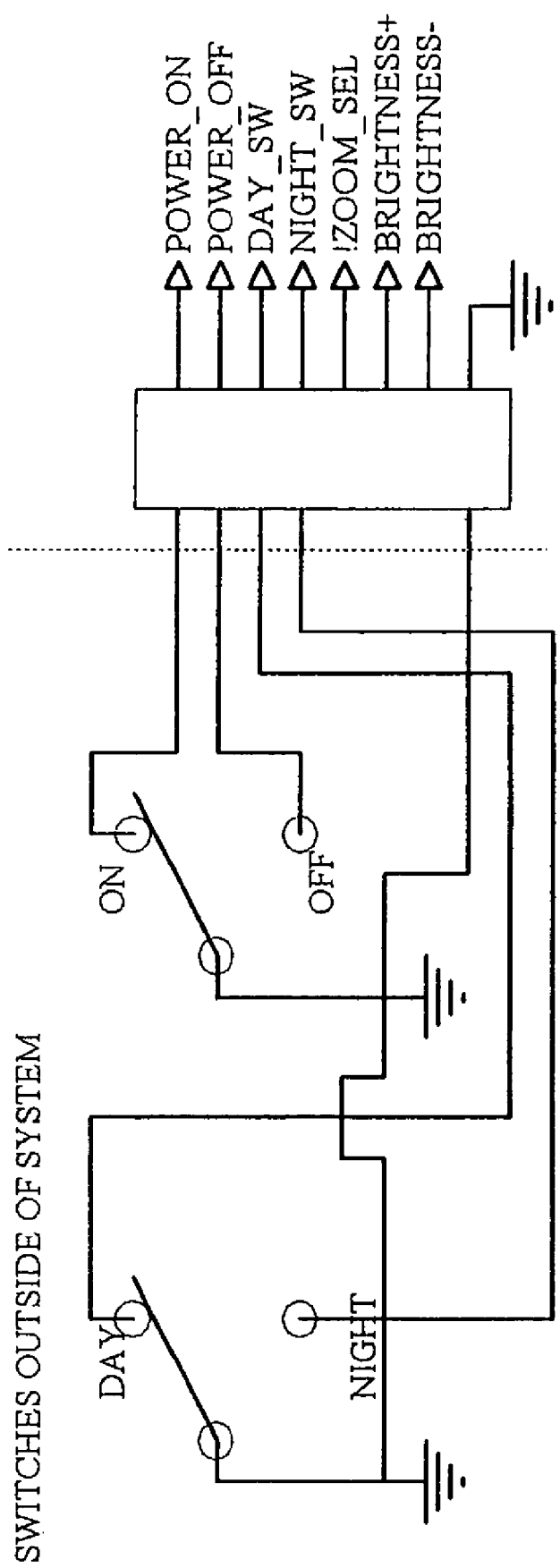
Figure 23:
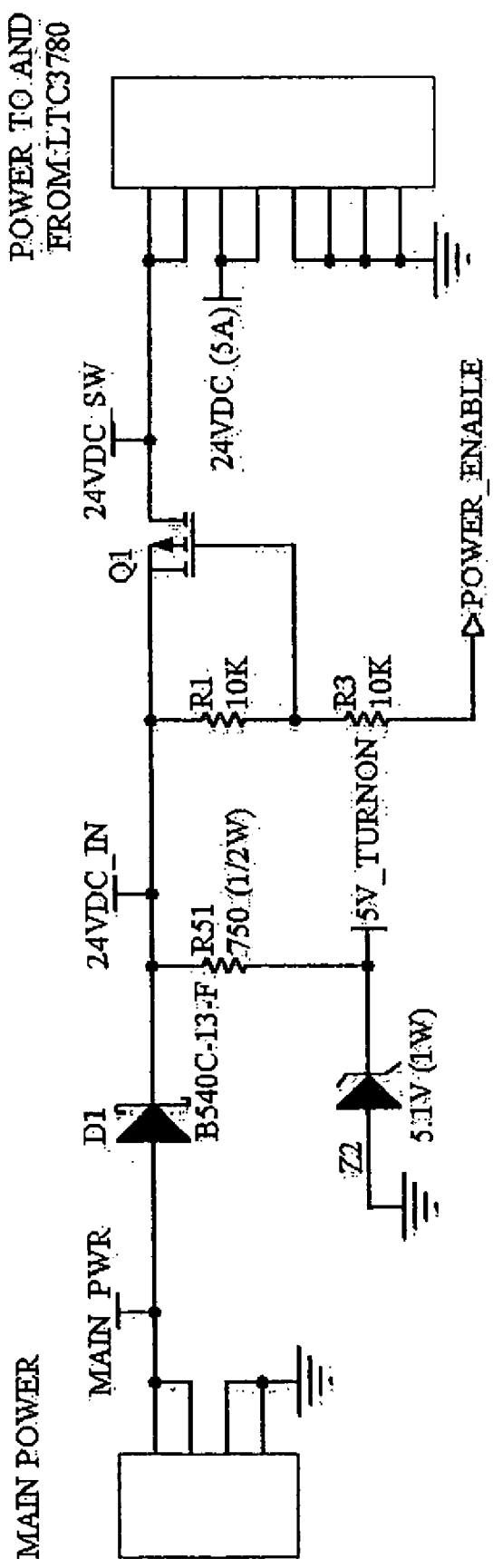
Figure 24:
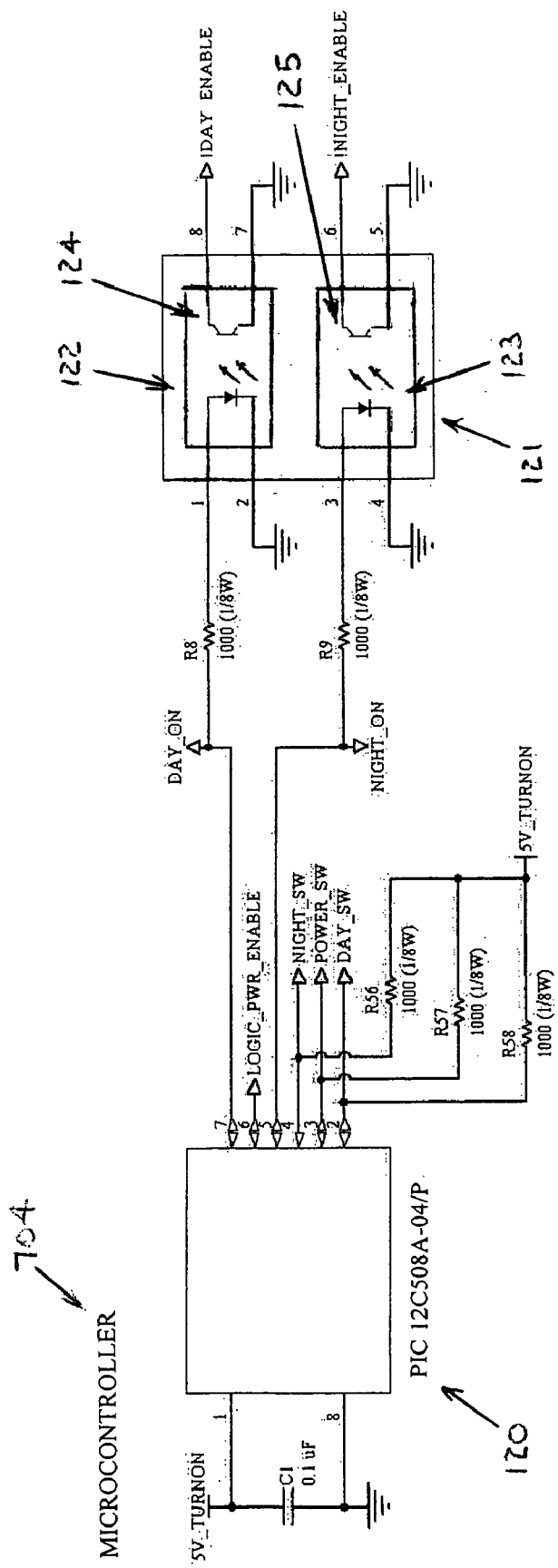
Figure 25:
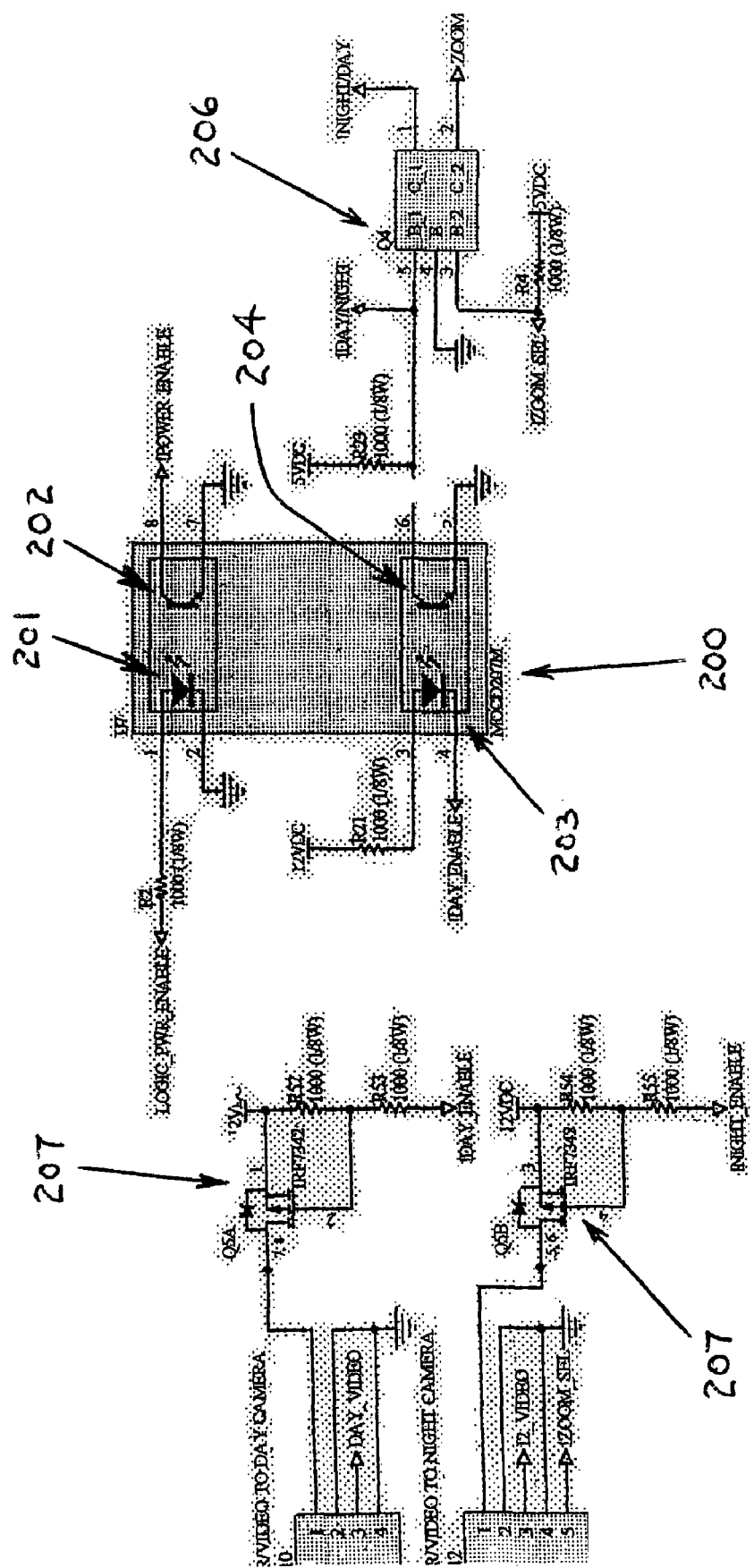
Figure 26:
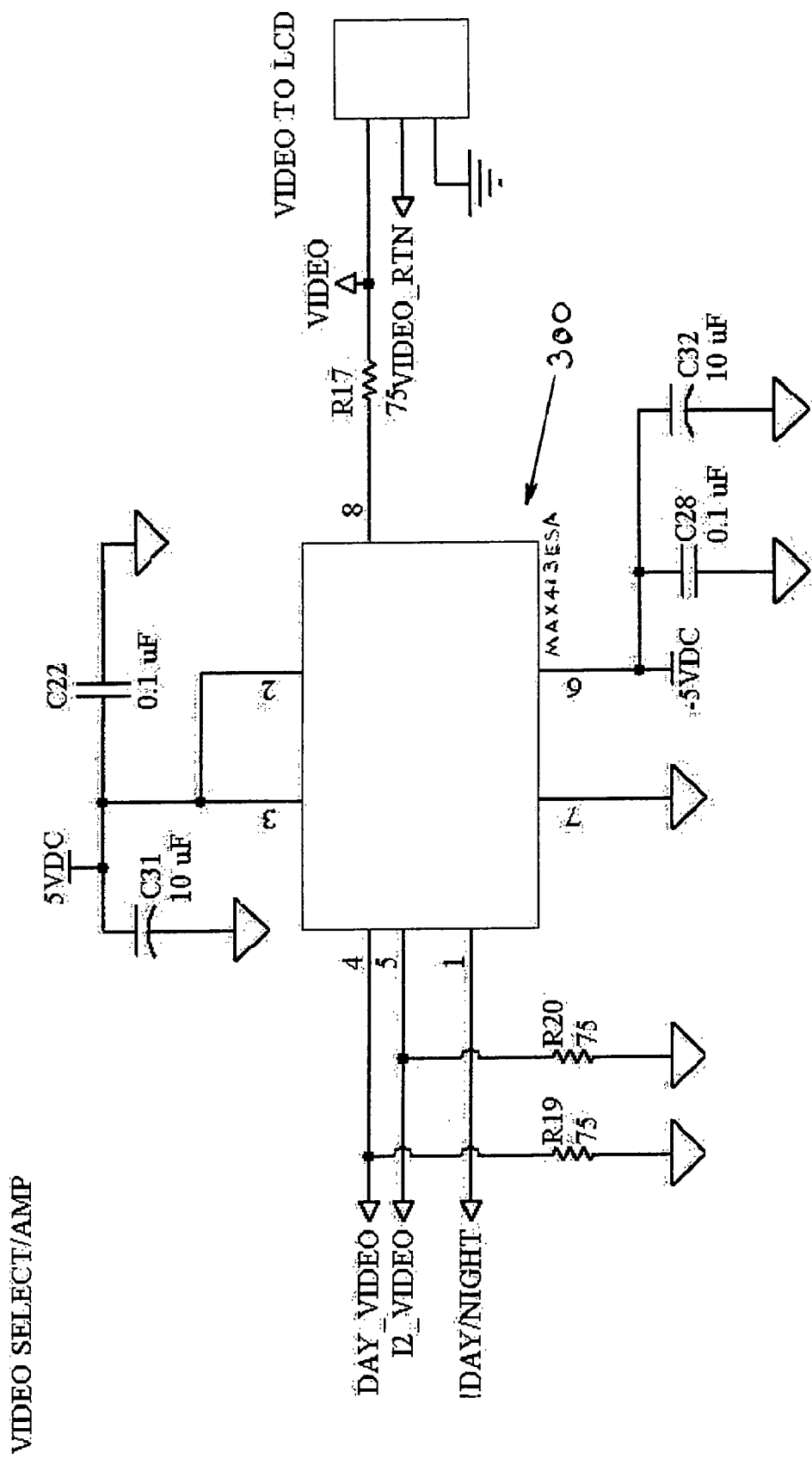
Figure 27:
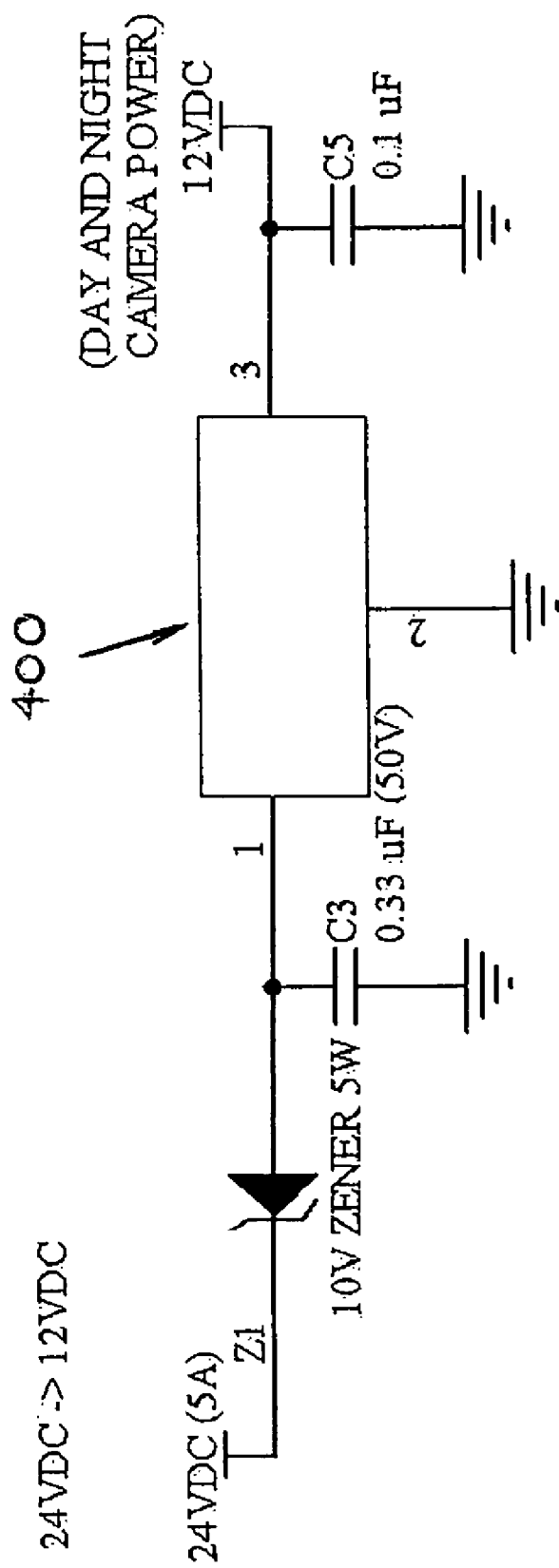
Figure 28:
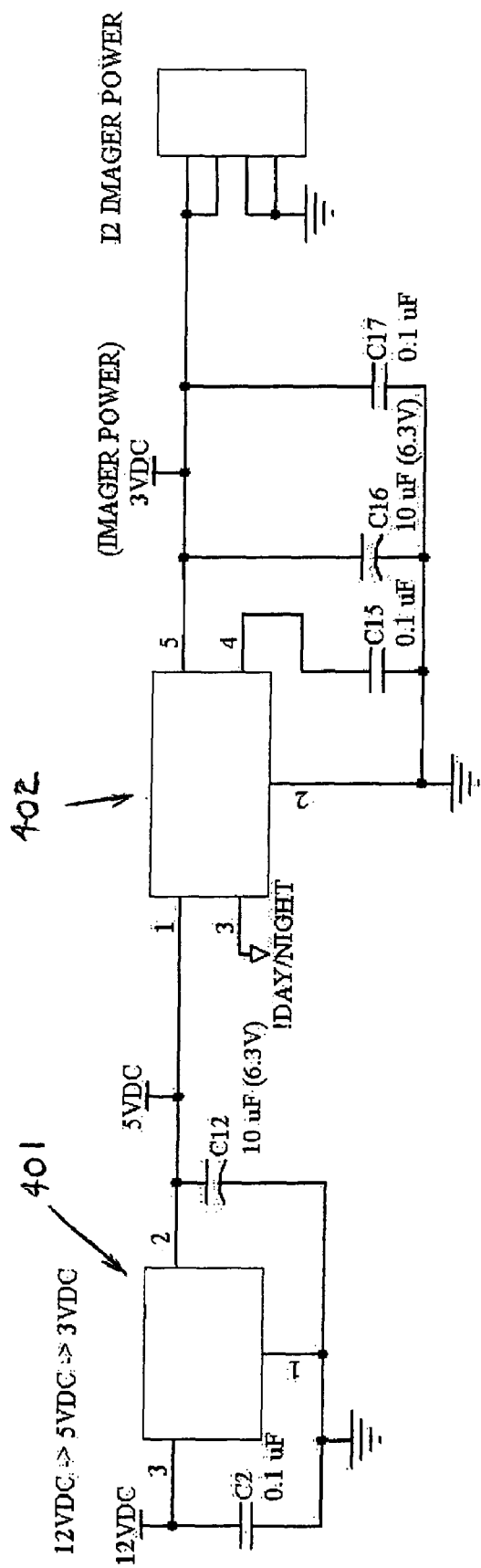
Figure 29:
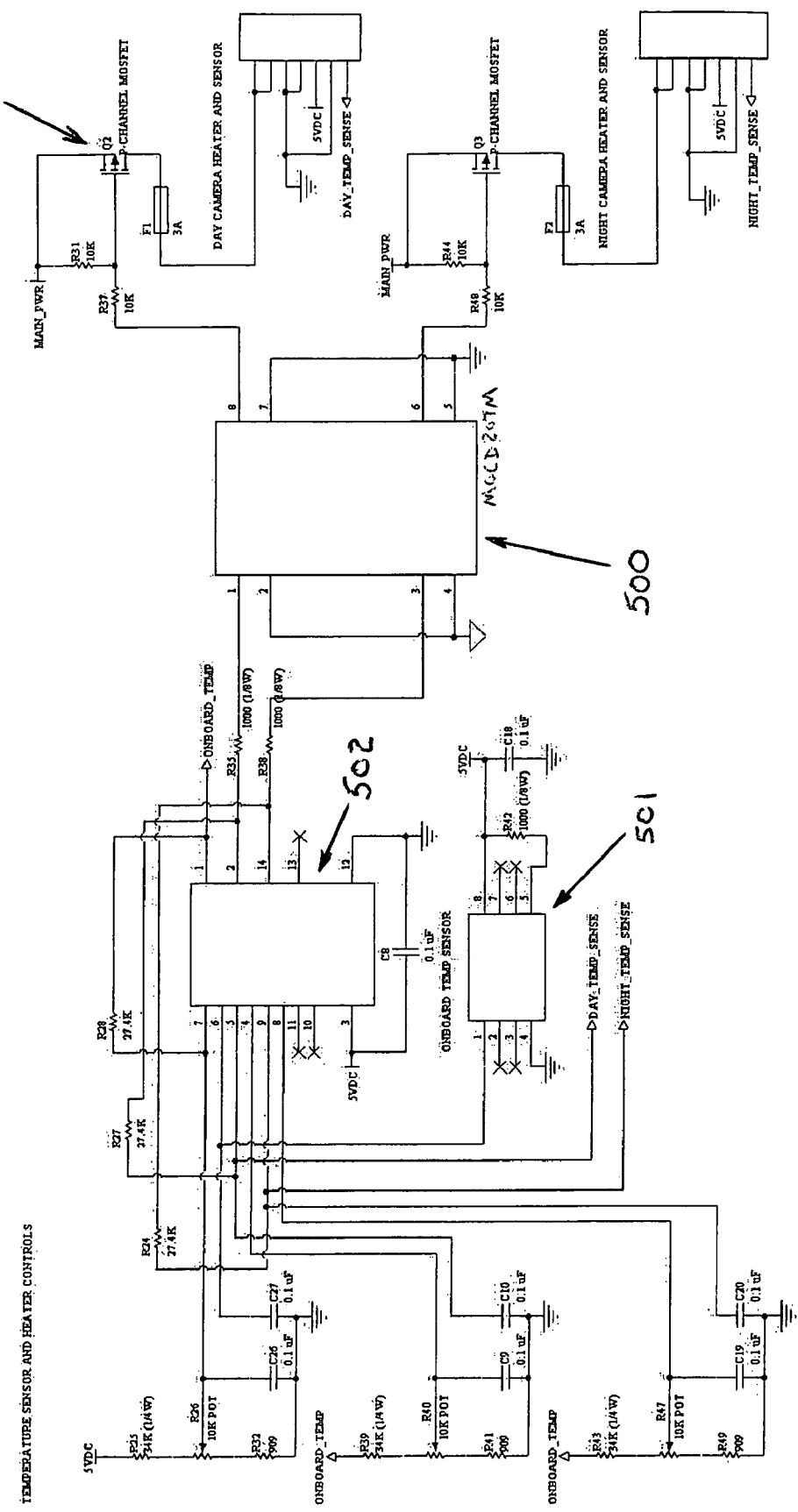

FIG. 1 is a front end view of day night elbow;
FIG. 2 is a back end view of day night elbow;
FIG. 3 is a left side view of day night elbow;
FIG. 4 is a rear end view of day night elbow;
FIG. 5 is a right side view of day night elbow;
FIG. 6 is a top end view of day night elbow;
FIG. 7 is a bottom end view of day night elbow;
FIG. 8 is a front end view of day/night elbow with housing cell removed;
FIG. 9 is a top view of day/night elbow with housing cell and bottom ring removed;
FIG. 10 is a top view of day/night elbow with housing cell and top ring removed;
FIG. 11 is a front end view of day/night elbow with housing cell and day camera alignment removed;
FIG. 12 is an exploded view of night camera assembly of day/night elbow;
FIG. 13 is a stand alone view of day/night elbow's camera mount;
FIG. 14 is a stand alone view of day/night elbow's camera mounting plate and day camera;
FIG. 15 is a stand alone view of day and/night elbow's camera mounting collar;
FIG. 16 is a stand alone view of day/night elbow's light intensifier;
FIG. 17 is a stand alone inside view of day/night elbow's light intensifier;
FIG. 18 is a stand alone inside view of day/night elbow's objective mount;
FIG. 19 is a stand alone inside view of day/night elbow's nighttime camera.
FIG. 20 is a functional block diagram of the present invention.
FIG. 21 is a schematic of the DC-DC converter of the present invention.
FIG. 22 is a schematic of the SPDT switches of the present invention.
FIG. 23 is a schematic of the main power circuitry of the present invention.
FIG. 24 is a schematic of the microcontroller circuitry of the present invention.
FIG. 25 is a schematic of the camera select circuitry of the present invention.
FIG. 26 is a schematic of the video select/amp circuitry of the present invention.
FIG. 27 is a schematic of the voltage regulator circuitry of the present invention.
FIG. 28 is a schematic of another voltage regulator circuit of the present invention.
FIG. 29 is a schematic of the temperature sensor and heater control circuitry of the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1 is housing 20 for the electronics that is required for the processing of the detected images and providing a visible display of the image elements on a monitor 21, any suitable monitor known in the art but not limited to a Cathode Ray Tube, Liquid Crystal Display, etc. In the present embodiment a high resolution color flat panel display was implemented. The shape of the housing 20 is constructed so as to house the electronics required to process the detected images, any suitable construction known in the art but not limited to a cubical, rectangular, etc may be used. In the present embodiment a cubical construction was implemented, as seen in FIG. 2. The cubical housing 20 has right, left, rear, and front walls 23, 24, 25, 26 respectively, and top and bottom surfaces, 27, and 28 respectively, as seen in FIGS. 1, 2, 3, 4, 5, 6, and 7. On the bottom side there may be a knob 29, a knob of any suitable construction known in the art may be used; in the present embodiment a fluted knob was implemented. On housing 20 there exist two covers, 30 and 31, located on sides 24 and 25 respectively, as seen in FIGS. 2, 3, 4. In addition, there exists a door 32, located on side 23. This specific configuration of covers and doors, is not based on necessity, it could have been constructed in a plethora of ways. Door 32 allows the user accessibility into housing 20, for repair, maintenance, etc.

"One of the key features of the present invention is the display monitor. As mentioned above one may implement any suitable display monitor known in the art including, but not limited to a Liquid Crystal Display (LCD), a plasma T.V., a Cathode Ray Tube, or the like. The display monitor allows imagery taken from the periscope 120, via the day or night camera, to be viewed. In addition, one may implement more than one monitor; this will depend on user requirements. For example, in one embodiment one may have more than one monitor on board, or in another embodiment one may have a monitor located in at a different location, i.e. a different vehicle or aircraft. With the latter embodiment the display seen on the monitor on board may be transmitted via radio signals to a different location where the other monitor is located. High a resolution color flat panel display monitor 21 is connected to front wall 26 of housing 20, any suitable connection method known in the art but not limited to a bolt, screw, clamp, weld, rivet etc. may be used. In the present embodiment a mounting bracket and bolts were implemented, not shown. Switches 33 may be used to control the periscope's 120 electronic equipment; any suitable switches known in the art but not limited to toggle switches, push button, etc. may be used. In the present embodiment toggle switches were implemented. Switches 33 may be placed on the flat panel display 21 or switches 33 may be placed in any location suitable for the users needs. In the present embodiment switches 33 were placed below screen 34 of flat panel display 21."

On top surface 27 of housing 20 is a hollow cell 35 used to house day camera assembly, 36 and night camera assembly 37, as seen in FIG. 8. The hollow cell 35 used to house camera assemblies 36 and 37, may be of any suitable shape including but not limited to cylindrical, rectangular, etc. In the present embodiment a cylindrical cell was implemented. Cylindrical cell 35 is mounted on top portion 27, any suitable mounting method known in the art may be used including but not limited to bolting, welding, etc. In the present embodiment cell 35 was bolted to top portion 27 of housing 20, as seen in FIGS. 2 and 6. Hollow cell 35 has a flanged bottom portion 38. Flanged bottom portion 38 has three apertures 39 that are aligned with three apertures 40 on top plate 27; this is to facilitate the mounting of hollow cell housing 35 to housing 20, as seen in FIGS. 2 and 6.

Inside of cell housing 35, post 41 extends upward and parallel to the inside of cell 35, and is used in multiple locations. The bottom portion 44 of post 41 is set in top surface 27 of housing 20. The post 41 may be of any suitable shape known in the art. In the present embodiment cylindrical posts were implemented, as seen in FIG. 8. The top portion 47 of post 41 is set in bottom surface 51 of bottom ring 50. Bottom ring 50 is defined by bottom surface 51, upper surface 55, inside wall 53 and outside wall, 54, as seen in FIG. 9 and FIG. 11. Extending up from top surface 55 of bottom ring 50 is post 56, which may have the same cross-section as post 41. The top portion 59 of post 56 is set into bottom surface 62 of top ring 63; top ring 63 may have the same circumference as bottom ring 50. Top ring 63 has two apertures, 64 and 65. Aperture 64 has inner wall 66, and a diameter large enough to secure day camera assembly 36. Aperture 65 has inner wall 67, and a diameter large enough to secure night camera assembly 37, as seen in FIG. 10.

Bottom ring 50 and top ring 63 have borings so as to house day and night camera assemblies. Bottom ring 50 has boring 68 located on top surface 55, as seen in FIG. 9. Boring 68 is of such dimension so as to house day camera alignment 69 of day camera 36, as seen in FIG. 8. Day camera alignment 69 houses day camera body 70, as seen in FIG. 8 and FIG. 11. Day camera alignment 69 has a top circular surface 71, with an aperture 72, located in its center to house day camera body 70. Day camera body 70 is a cylindrical tube with a protrusion 73 at it's bottom, as seen in FIG. 11. Protrusion 73 is of such dimension so as to fit into an aperture in top circular surface 71 of day camera alignment 69. Day camera body 70 is of such dimension so as to be able to house day camera objective 74. Day camera objective 74 rests in day camera body 70 and is set into aperture 64 of top ring 63, as seen in FIGS. 10 and 11 Aperture 64 of top ring 63 has a diameter capable of securing camera objective 74. Top surface 71 of camera objective 74 may be flush with top surface 64 of top ring 63.

Night camera assembly 37, as seen in FIG. 12, has a camera mount 75, as seen in FIG. 13, any suitable type of camera mount known in the art may be used. In the present embodiment a cylindrical mount was implemented. Camera mount 75 can best be described as having a circular bottom portion 76 and a circular top portion 77. Bottom portion 76 has inner and outer walls 78 and 79 respectively, and has top and bottom surfaces 80 and 81 respectively. Top portion 77 also has inner and outer walls, 82 and 83 respectively, and top and bottom surfaces 84 and 85 respectively. Top portion 77 may have an inner diameter equal to the inner diameter of bottom portion 76. Top portion 77 has an outer diameter less then the outer diameter of bottom portion 76, which will leave top surface 80 partially exposed. Night camera 37 has a camera mounting plate 86, as seen in FIGS. 12 and 14, any suitable type of camera mounting plate known in the art may be used, in the present embodiment the camera mounting plate is a circular plate with aperture 87 in its center. It has inner and outer walls 88 and 89 respectively, and top and bottom surfaces 90 and 91 respectively. The diameter of camera mounting plate 86 is the same as top portion 77 of camera mount 75. In addition, camera mounting plate 86 has 4 linear grooves 92 located on bottom surface 91, which are perpendicular to each other, thus forming a grooved square on bottom surface 91. Night camera 93, as seen in FIGS. 12 and 14, may be any suitable camera known in the art, in the present embodiment the night camera 93 has a platform 94 on its lower body. Platform 94 of night camera 93 fits into grooves 92 located on bottom surface 91. Night camera assembly 37 has a camera mount collar 95, as seen in FIGS. 12 and 15; any suitable known collar in the art may be used. In the present embodiment the camera mount collar 95 has a circular bottom portion 96 and a circular top portion 97. In addition camera mount collar 95 has threads 98 on it's upper inside wall surface. In the present embodiment the camera mount collar 95 is designed to fit over camera mount plate 86, and rest on the exposed area of top surface 80 of camera mount 75 so as to hold platform 94 of night camera 93 in place.

Night camera assembly 37 has a light intensifier tube 99, as seen in FIGS. 12 and 16; any suitable light intensifier known in the art may be used. In the present embodiment a tubular light intensifier was implemented. Light intensifier 99 is configured with dimensions similar to an open top end drum, which allows for it to fit inside night camera mount collar 95 and surround night camera 93. Light intensifier 99 has inner and outer walls, 100 and 101 respectively, a circular bottom plate with bottom and top surfaces, 102(a) and 102(b) respectively, with aperture 103 in its center. One may implement any suitable known light intensifier in the art including, but not limited to 18 mm, 25 mm and the like. In a preferred embodiment one implemented a 18 mm image intensifier tube, with microchannel plate capability. Inner wall 100 has a circular inner lip 104, as seen in FIG. 17 that extends around the inner circumference of light intensifier 99, located near the middle of inner wall 100. The upper and lower portions of light intensifier's 99 outer wall 101 also have external threads 105. Light intensifier 99 acts like a couple between night camera mount collar 95 and night camera objective mount 106, as seen in FIGS. 12 and 18, any suitable night camera objective mount known in the art may be used. In the present embodiment night camera objective mount 106 has a circular bottom portion 107 with inner and outer walls, 108 and 109 respectively, and top and bottom surfaces 110 and 111 respectively. Circular inner wall 108 is also partially threaded. The threads of collar 95, light intensifier 99 and objective mount 106 will interlock when they are joined. Night camera objective mount 106 has a circular top portion 112 with inner and outer walls 113 and 114 respectively, and top surface 115.

Bottom ring 50 has aperture 53, where aperture 53 is of such dimension so as to allow night camera objective mount 106 to fit through bottom ring 50. Both, top surfaces 110 of circular bottom portion 107 and top surface 115 of circular top portion 112 of night camera objective 107 lie above the top surface 55 of bottom ring 50.

Night camera objective 117 of night camera assembly 37 may be any suitable night camera objective known in the art. In the present embodiment the night camera objective 117 was able to fit inside night camera objective mount 106. The base 119 of night camera objective 117 rests on the inner lip portion 104 of inner wall 100 of light intensifier 99.

"In normal operation the user will power up the LCD display via power switch 33. The user may then view the outside perimeter with the periscope 120 of the present invention. The user, in day time viewing, may choose the day bullet camera via switch 33. Conversely, for night time viewing the user may choose the night board camera via switch 33. The user may then utilize some of the key functions of the present invention, by communicating with the internal electric circuitry by means of the Power/Video-CB2 100 supply hub."

The functionality of the key features of the present invention will now be discussed with reference to the CB2 functional block diagram, as seen in FIG. 20, along with reference to the electronic circuit diagrams shown in FIGS. 21-29.

As seen in FIG. 20, is the Power/Video-CB2 700 supply hub. Power/video-CB2 supplies power, and inputs/outputs to a different components of the present invention. For example, power/video-CB2 provides a steady power supply to the LCD display. This is accomplished by connecting the leads from the transient suppression module 701 to power/video CB-2, as seen in FIG. 20. A detailed description of this connection may be seen in FIG. 23. Pins 1 and 2 of transient suppression module 701 are connected to the main power supply, and pins 3 and 4 are connected to ground. From transient suppression module 701 the regulated power is sent to the power and signal connector to the internal circuitry of the LCD display, as seen in FIG. 20.

The present invention utilizes many different circuits and as such needs many different voltages. In the present invention one implemented 3 voltage regulators, as seen in FIGS. 27 and 28. FIG. 27 is an example of one of the voltage regulators that was implemented; it is a precision 1 amp regulator that allows output voltages of up to 24 volts. Pin 1 of voltage regulator 400, VR1, will generally have an input voltage less then the main power supply. The voltage at pin 1 may be adjusted by implementing a variety of different circuit configurations, depending on how much regulated voltage is desired at pin 3 of voltage regulator 400. One such configuration may be seen in FIG. 27. A Zener diode, ZR1, with a rating of 10V and 5 W was placed in series with the 24 VDC power supply. In addition, a 3.3 µF capacitor was placed in parallel with the voltage regulator. In the present invention the Zener diode will allow current to flow only after a certain voltage drop is obtained across the diode. The output at pin 3 will be approximately 12 VDC, which will be used to power the day and night camera. In another embodiment one may implement an Astrodyne DC-DC converter.

The 12 VDC at pin 3 of voltage regulator 400 will also be routed to pin 3 of another voltage regulator 401, VR2, this voltage regulator operates similarly as the previously discussed voltage regulator and for purposes of brevity a detailed discussion will not be introduced. The output of VR2, will be approximately 5 VDC, and felt at pin 1 of VR3 402. The output of VR3 will be approximately 3 VDC, and felt at pin 5 of VR3, and used to power the ISQ Device at leads 1 and 3, as seen in FIGS. 20 and 28. Leads 3 and 4 of the ISQ Device are connected to ground.

Also connected to the power/video-CB2 is the LTC3780 regulator board 702. The LTC 3780 regulator board serves as a high performance switching regulator controller that operates from input voltages above, below, or equal to the output voltage. The connection may be seen in more detail in FIG. 23. Pins 1 and 2 are connected to the 24 VDC SW power supply; pins 3 and 4 are connected to the 5 amp 24 VDC power supply, and the remaining pins 5-8 are connected to ground.

Located on the outside of the housing of the LCD may be 4 switches 33, as mentioned previously. A switch panel 703 may be located inside of housing 20. The switches that were implemented in the present embodiment were a power switch, a switch for choosing the day or night camera, a zoom, in or out switch, and a dim, up or down switch. For a more detailed description of the wiring diagram, see FIG. 22. The power switch may be configured so that the "on" setting is connected to pin 1 of power/video-CB2 700, and the "off" setting is connected to pin 2 of power/video-CB2 700, as seen in FIG. 23. In addition pin 3 may be connected to the day setting and pin 4 may be connected to the night setting of power/video-CB2. Also, pin 5 may be connected to zoom select and pins 6 and 7 may be connected to dim, up and down, respectively. In normal operation when the user desires to turn on the LCD monitor, the user will place the "on/off" switch to the on position. In addition the user may place camera switch, into either day or night mode. Also, the user may choose zoom, or dim, up or down, if desired.

When the switches are placed into the desired position, pulses will be transmitted to the microcontroller 704, located inside of power/video-CB2 700, as seen in FIG. 24. Microcontroller 704 may include a PIC 12C508A-04/P chip 120. Chip 120 comes from a family of low-cost high performance, 8-bit, fully static, EEPROM/EPROM/ROM-based CMOS microcontrollers. Chip 120 employs RISC architecture with only 33 single word/single cycle instructions. Chip 120 has 8 pins. Pin 1 has a 5 VDC positive supply, referenced VDD, for logic and I/O pins. Pin 8 is connected to ground and is referenced by VSS. In between pins 1 and 8 may be a 0.1 µF capacitor. Pins 2, 3, and 4 receive input signals from the day, power, and night switches respectively. Pins 2, 3, and 4 may be connected to the 5 VDC power supply. In addition pins 2, 3, and 4 may be connected to resistors R58, R57, and R56 respectively. Resistors R56, R57, and R58 may have different or the same resistances. In the present embodiment all the resistors in microcontroller 704 had the same resistance, 1000 Ωs. In the present embodiment pin 4 of chip 120 may not have a voltage drop greater then VDD, i.e. 5V, because this would cause chip 120 to enter a programming mode. Pins 5, 6, and 7, are generally Bi-directional I/O ports. Pin 5 may be also configured as a TOCKL.ABl Pins 5, 6, and 7 were implemented in the present invention as output ports.

Pin 6 was implemented to send an output, LOGIC POWER ENABLE, and pins 5 and 7 were implemented to send signals to a MOCD 207M dual channel phototransistor 121. The output of pin 7 of chip 120 is sent to pin 1 of dual phototransistor 121. Pin 1 of dual phototransistor 121 is connected to the anode of LED 122, light emitting diode, and pin 2 is connected to ground. In addition, a resistor, R8, may be located in series with anode of light emitting diode 122. The output of pin 5 is sent to pin 3 of dual phototransistor 121. Pin 3 is connected to the anode of LED 123, light emitting diode, and pin 4 is connected to ground. A light emitting diode is a semiconductor device that emits incoherent narrow-spectrum of light. In addition, there may also be a resistor, R9, which may be located in series with anode of light emitting diode 123. Both R8 and R9 may have resistances of 1000Ω each. Pin 8 of dual phototransistor 121 is connected to the collector of one of the phototransistor, and pin 7 is connected to the emitter. The output at pin 8 is designated for DAY ENABLE, and pin 7 is a ground. Pin 6 of dual phototransistor 121 is connected to the collector 125 of the other phototransistor 125, and pin 5 is connected to the emitter. The output of pin 6 is designated for NIGHT ENABLE, and pin 5 is connected to ground. In normal operation when the LED is electrically biased in the forward direction a narrow spectrum of light will be created, which will reach the base-collector junction of the phototransistor. The end result will be either a DAY ENABLE or a NIGHT ENABLE, depending on the switch that was selected.

In normal operation the output from pin 6 of chip 120 will be transmitted to different parts of the power/video-CB2. In addition, the outputs from pins 8 and 6, of dual phototransistor 121, will also be transmitted to different parts of the power/video-CB2. For example, as seen in FIG. 20 Day Bullet Camera block and Night Board Camera block are connected to power/video-CB2, via J10 and J12, respectively; these blocks include camera selection circuitry.

A more detailed description of the camera selection circuitry may be seen in FIG. 25. The camera selection circuitry includes another dual MOCD 207M dual channel phototransistor 200. The LOGIC POWER ENABLE is transmitted to pin 1 of dual phototransistor 200. In addition, there may be a resistor connected in series with pin 1 of dual phototransistor 200. Pin 1 is also connected to the anode of the LED 201. Pin 2 of LED 201 of dual phototransistor 200 is connected to ground. Pin 8 of dual phototransistor 200 is connected to the collector 202. Pin 7 is also connected to ground and pin 8 is part of the POWER ENABLE circuitry. In addition, pin 3 of dual phototransistor 200 may be connected in series with a 1000Ω resistor, R21, and a 12 VDC potential, as seen in FIG. 25. Pin 3 is also connected to the anode of LED 203 of dual phototransistor 200 and pin 4 is part of the DAY ENABLE circuitry. Pins 6 and 5 are connected to the collector 204 and emitter respectively; pin 5 is also connected to ground. Pin 6 may also be connected in parallel with a double transistor Q4, 206, as seen in FIG. 25. In addition, a 5 VDC potential with a 1000Ω resistor, R21, connected in series, may be implemented to supply power to the collector 204, and to pin 5 of double transistor Q4, 206, as seen in FIG. 25. Pin 5 is connected to base 1 of double transistor Q4. Pin 4 is connected to the emitter of double transistor Q4, and to ground. Pin 3 is connected to a 1000Ω resistor R4, and a 5 VDC potential. Pins 1 and 2 are connected to collectors 1 and 2 respectively. In addition, the output of pin 1 is connected to the NIGHT/DAY circuitry, and the output of pin 2 is connected to the ZOOM circuitry.

The Power/Video-CB2 communicates with the above digital circuitry via J10 and J12, as seen in FIG. 20. J10 routes input and output signals via leads 1, 2, 3, and 4 for the day camera, and J12 routes inputs and outputs for the night camera via leads 1, 2, 3, 4, and 5. An IRF 7342 MOSFET 207 may be connected to leads, 1 of night camera block and 1 of day camera block. Lead 1 of the day camera block may be connected to the drain 1 of the MOSFET 207, located at pins 7 and 8. Lead 1 of the night camera block may be connected to the drain 2 of the MOSFET 207, located at pins 5 and 6. In addition, pins 1 and 2 of the MOSFET 207 will be connected to source 1 and gate 1 respectively, and pins 3 and 4 of the MOSFET 207 will be connected to source 2 and gate 2 respectively. Power to the day and night camera selection will be supplied via a 12 VDC potential. In normal operation, depending on the camera selection, the output of either the day or night camera will be transmitted, via leads 3 of, J10 or J12 respectively, to the LCD of the present invention, as seen in FIG. 20.

Power/Video-CB2 communicates with the LCD via leads 1, 2, and 3, of junction, J2, as seen in FIG. 20. A more detailed description of the digital and analog circuitry may be seen in FIG. 26. The main circuitry may include a video amp, which implements a 2 channel multiplexer (hereinafter mux), as an input to the non-inverting leg of the amp. In the present embodiment one implemented a MAX 4313ESA chip 300. Chip 300 is a high speed, low-power, single-supply multi-channel, video multiplexer-amplifier. One chose chip 300, because of its excellent harmonic distortion and differential gain/phase performance. Lead 3 of J10 from day camera may be connected to pin 4 of chip 300. One may also connect lead 3 from J12 from night camera to pin 5 of chip 300. The output of chip 300 may be connected to the non-inverting input of the amplifier of chip 300. Other pin connections may be as follows, pin 6 may be connected to a −5 VDC, represented by $V_{EE}$ and pin 3 may be connected to a 5 VDC, represented by $V_{CC}$. In addition, pin 7 may be connected to ground, and pin 1 may be an input selector, designated A0. Furthermore, all parts feature a low-power shutdown mode that is activated by driving the SHDN input low, located at pin 2. The output video of chip 300, located at pin 8, is connected to lead 1 of J2. Chip 300 operates like most typical muxs, that is, a device that has multiple input streams and only one output stream. It forwards one of the input streams to the output stream based on the values of one or more of the "selection inputs". For example, a two input multiplexer, like the one in the present invention, is a simple connection of logic gates whose output Y is either input A or input B depending on the value of a third input S which selects the input. In normal operation of the present invention chip 300 will have an input either at pin 4 or 5 depending on which camera is selected. Pin 1 will select the appropriate input, based upon the signal from pin 5 of Q4 of the camera selection block. The input will then be transmitted to the non-inverting leg of the amplifier, where it will be amplified and transmitted to the LCD, as video for display. One may also implement a variety of different bypass capacitors and resistors to obtain the desired gain, one type of configuration may be seen in FIG. 26. Lead 3 from J2 of the LCD is connected to ground and lead 2 from J2 of the LCD is the video return lead which transmits the video back lead 4 of J10 or J12, depending on which camera is selected.

The power/video-CB-2 also communicates with the Bullet Camera Heater & Sensor, and the Night Camera Heater & Sensor, as seen in the functional block diagram, FIG. 20. A more detailed description of the heater sensor may be seen in FIG. 29.

This circuitry compares the onboard temperature to the outside temperature. The main power supply is routed to both the day and night camera heater and sensor circuitry, as seen in FIG. 29. Both circuitries may be identical and for the purposes of brevity, only the day camera circuitry will be discussed. The main power is connected in parallel to a P-channel enhancement transistor Q2 503, and a 10K resistor, R31. R31 may be connected to the gate of Q2 503, and to another 10K resistor, R37, a seen in FIG. 29. In between the drain of Q2 503 and leads 1 and 2 of J9 may be a 3 amp fuse. J9 also may have leads 3, 4, and 6 connected to ground and lead 5 may be connected to regulated 5 VDC power source. In addition lead 7 may transmit the DAY TEMP signal. As mentioned above R31 may be connected to the drain of Q2 503 and to another resistor, R37. R37 may also be connected to one collector, pin 8, of a dual phototransistor 500. Dual phototransistor 500 operates similarly to the previously mentioned dual phototransistor 200, and for the purposes of brevity will not be discussed.

The day camera heater and sensor circuitry also has an onboard temperature sensor 501. In the present embodiment a TMP36 low voltage temperature sensor was implemented. The TMP36 is a low voltage, precision, centigrade temperature sensor. It provides a low output that is linearly proportional to the Celsius temperature. The low output impedance of the TMP36 and its linear output and precise calibration simplify interfacing to temperature control circuitry and A/D converters. Pin 8 is connected to the 5 VDC power supply. One may also have a 0.1 μF capacitor located at the input near pin 8. Generally, this capacitor should be a ceramic type, have very short leads (surface-mount is preferable), and be located as close as possible in physical proximity to the temperature sensor supply pin. Pins 6 and 7 are generally not connected, and pin 5 is the SHTDN pin. Generally, a logic low, or zero-volt condition on the SHTDN pin is required to turn off the output stage. During shutdown, the output of the temperature sensors becomes a high impedance state where the potential of the output pin would then be determined by external circuitry. In addition, TMP36 has pins 1, 2, 3, and 4. Generally pin 4 is connected to ground and pins 2 and 3 are not connected. Pin 1 is the output pin and is referenced by VOUT, as seen in FIG. 29.

The output at pin 1 of temperature sensor 501 is transmitted to a voltage comparator 502. In the present embodiment a TS339CPT chip was implemented to perform the needed comparison. The TS339 is a micropower CMOS quad voltage comparator with extremely low consumption of 9 μA typ/comparator. One may also implement a quad micropower comparator TS3704 with a push-pull CMOS output. Pins 1, 2, 14, and 13 are output pins, and pins 4-11 are input pins. Pin 3 is the input voltage, referenced VCC, and pin 12 is ground, referenced GND. All the input pins operate in similar fashion, i.e. they compare voltages and transmit an output to a corresponding pin. Pin 7 is also connected to a 5 VDC potential. Pins 5, 6, and 9 receive the onboard temperature signal, and pins 4 and 8 receive the DAY TEMP sense signals and NIGHT TIME TEMP signals respectively. Thus, one may connect pins 6 and 7 to compare the onboard temperature, and transmit an output on pin 1. The output on pin 1 may then be transmitted to one of two separate circuits. These circuits may be identical, which may include resistors, and capacitors. The resistors may have fixed values or the resistors may vary, i.e.

potentiometers. The resistors and capacitors may have a range of values; this will depend on the desired need and output of the user.

In normal operation the user will turn the power switch to the on position and select a camera, either the day or night. For example, if the day camera is selected; the user will place the camera select switch 33 to the day camera position. The signal from lead 3 of J5 will then be transmitted to pin 2 of chip 704 of the microcontroller block. The output signal will then be transmitted to LED 122 of dual phototransistor 121. The light emitted from LED 121 will cause phototransistor 124 to allow current to flow, thus allowing the DAY ENABLE signal to reach different circuits of the invention. For example, a signal will be sent to chip 300 of the video select/amp, via J10. In addition, the temperature sensor and heater controls will be activated by the power enable signal, thus allowing the onboard temperature and the ambient temperature to be compared, via chips 501 and 502.

As various changes could be made in the above constructions without departing from the scope of the invention, it is intended that all matter contained in the above description shall be interpreted as illustrative and not in a limiting sense. In the view above it will be seen that several objects of the invention are achieved and other advantageous results attained.

I claim:

1. A periscope system comprising, a first camera system for receiving an image in a low light environment, said first camera system transmitting the image through an intensifier to a video display monitor for viewing the image; said periscope system further comprising a second camera system for receiving an image in a day light environment, said second camera system transmitting the day light image to said monitor, a first switch communicably linked to said first and second camera system; said first switch communicably linked to said video display monitor; said first switch having a first position and a second position, said first position of said first switch communicably linking said first camera system to said video display monitor such that said video display monitor displays an image received by said first camera system, said second position of said first switch communicably linking said second camera system to said video display monitor such that said video display monitor displays an image received by said second camera system, said video display monitor displaying the image in a day light environment separately from the image in a low light environment.

2. The periscope system according to claim 1 wherein said first camera system is an infrared camera.

3. The periscope system according to claim 1 wherein said second camera system is a day camera.

4. The periscope system according to claim 1 wherein said first camera system is capable of operating in low light.

5. The periscope system according to claim 1 wherein said second camera system is a bullet camera.

6. The periscope system according to claim 1 wherein said first camera system is a board camera.

7. The periscope system according to claim 1 wherein said intensifier has a 18 mm image intensifier tube.

8. The periscope system according to claim 7 where said intensifier has a high speed gate.

9. The periscope system according to claim 8 where said intensifier performs motion analysis of high speed objects.

10. The periscope system according to claim 9 wherein said intensifier performs fluorescence lifetime imaging.

11. The periscope system according to claim 7 wherein said intensifier has microchannel plates to create an image by detecting single photons.

12. The periscope system according to claim 11 where said intensifier has a high speed gate.

13. The periscope system according to claim 12 where said intensifier performs motion analysis of high speed objects.

14. The periscope system according to claim 13 wherein said intensifier performs fluorescence lifetime imaging.

15. The periscope system according to claim 1 wherein said video display monitor is a high resolution color flat panel display monitor.

16. The periscope system according to claim 15 wherein said first camera system has a heater and a temperature sensor.

17. The periscope system according to claim 16 wherein the temperature sensor compares the onboard temperature to the ambient temperature, and when the difference exceeds a predetermined threshold value, current is permitted to flow in heater circuitry located in at least a portion of said periscope, thereby maintaining the temperature of said first camera system within an optimal range.

18. The periscope according to claim 15 wherein said second camera system has a heater and temperature sensor.

19. The periscope system according to claim 18 wherein the temperature sensor compares the onboard temperature to the ambient temperature, and when the difference exceeds a predetermined threshold value, current is permitted to flow in heater circuitry located in at least a portion of said periscope, thereby maintaining the temperature of said second camera system within an optimal range.

20. The periscope system according to claim 1 wherein said video display monitor electronically displays a plurality of reticles that are in focus over a plurality of ranges.

21. The periscope system according to claim 1 wherein said video display monitor is fatigue free.

22. The periscope system according to claim 1 wherein one or more additional monitors are connected to said periscope system to provide real time remote viewing of the low light image or the day light image transmitted by said periscope system.

23. The periscope system according to claim 1 wherein said intensifier has microchannel plates to create an image by detecting single photons.

24. The periscope system according to claim 1 wherein said first camera system has a heater and a temperature sensor.

25. The periscope system according to claim 24 wherein the temperature sensor compares the onboard temperature to the ambient temperature, and when the difference exceeds a predetermined threshold value, current is permitted to flow in heater circuitry located in at least a portion of said periscope system, thereby maintaining the temperature of said first camera system within an optimal range.

26. The periscope system according to claim 24 wherein the temperature sensor compares the onboard temperature to the ambient temperature, and when the difference exceeds a predetermined threshold value, current is permitted to flow in heater circuitry located in at least a portion of said periscope system, thereby maintaining the temperature of said second camera system within an optimal range.

27. The periscope according to claim 1 wherein said second camera system has a heater and temperature sensor.

28. The periscope system according to claim 1 wherein the day light image and the low light image are inputted to a power/video supply hub, said power/video supply hub outputting the low light image to said video display monitor, and said power/video supply hub outputting the day light image to said video display monitor.

29. The periscope system according to claim 28 wherein said power/video supply hub is connected to a switch panel, said switch panel communicably linked to said video display monitor; said switch panel communicably linked to said first and second camera system.

30. The periscope system according to claim 29 wherein a second switch is in communication with said switch panel, said second switch communicably linked to said first and second camera system, said second switch having a first position and a second position, said first position of said second switch causing said first camera system or said second camera system to zoom in; said second position of said second switch causing said first camera system or said second camera system to zoom out.

31. The periscope system according to claim 30 wherein a third switch is in communication with said switch panel, said third switch communicably linked to said video display monitor, said third switch having a first position and a second position, said first position of said third switch increasing the dimness of said video display monitor, said second position of said third switch decreasing the dimness of said video display monitor.

32. The periscope system according to claim 31 wherein a fourth switch is in communication with said switch panel, said fourth switch communicably linked to said video display monitor, said fourth switch communicably linked to said first and second camera system, said fourth switch having a first position and a second position, said first position of said fourth switch causing said video display monitor and said first and second camera system to power on, said second position of said fourth switch causing said video display monitor and said first and second camera system to power off.

33. The periscope system according to claim 32 wherein said first switch, said second switch, said third switch, and said fourth switch are all secured to said video display monitor.

34. The periscope system according to claim 33 wherein said display monitor provides still shots of the low light image or the day light image.

35. The periscope system according to claim 1 further comprising a housing, said housing comprising at least one sidewall, an upper section, a lower section, a top ring, a bottom ring, a plurality of posts extending up from said bottom ring, said posts adapted to be received by said top ring, said top ring further comprising at least a first orifice and a second orifice; said first orifice adapted to secure a portion of the said first camera system, said second orifice adapted to secure a portion of said second camera system.

36. The periscope system according to claim 1 wherein said first and second camera system are adapted to operate on a mobile platform.

37. The periscope system according to claim 1 wherein at least one of said camera systems transmits the image to at least one video display monitor via a radiowave.

38. The periscope system according to claim 1 wherein, said periscope system further comprises a periscope, said first camera system adapted to receive an image through said periscope in a low light environment, said second camera system adapted to receive an image through said periscope in a day light environment.

39. A periscope system for a mobile platform comprising a first camera system for receiving an image in a low light environment; said first camera system comprising an infrared camera capable of operating in low light, an image intensifier, a heater, and a temperature sensor;

said infrared camera transmitting said image through said intensifier to a video display monitor via a radio wave for viewing said image;

said image intensifier further comprising a high speed gate, at least two microchannel plates; said microchannel plates able to create an image by detecting single photons;

said intensifier able to perform motion analysis of high speed objects and fluorescence lifetime imaging;

said temperature sensor comparing the temperature of onboard circuitry of said first camera system to the ambient temperature, and when the difference exceeds a predetermined threshold value, current is permitted to flow in said heater located in at least a portion of said periscope system, thereby maintaining the temperature of said first camera system within an optimal range;

said periscope system further comprising a second camera system comprising a day camera capable of receiving an image in a day light environment, a heater, and a temperature sensor;

said second camera system transmitting said day light image to a video display monitor via a radio wave, displaying the image in a day light environment separately from the image in a low light environment;

said temperature sensor of said second camera system comparing temperature of the onboard circuitry of said second camera system, and when the difference exceeds a predetermined threshold value, current is permitted to flow in said heater of said second camera system located in at least a portion of said periscope system, thereby maintaining the temperature of said second camera system within an optimal range;

said periscope system further comprising at least one additional video display monitor connected to said first and second camera system; said additional video display monitor capable of providing real time remote viewing of said image captured by said first and second camera system;

said periscope system further comprising at least one high resolution color flat panel display monitor; said high resolution color flat panel display monitor capable of displaying a plurality of electronic reticles that are in focus over a plurality of ranges;

said periscope system further comprising a power/video supply hub, and a switch panel; said power/video supply hub is connected to said switch panel; said day light image and said low light image are inputted to a power/video supply hub, said power/video supply hub outputting the low light image to said video display monitor, and said power/video supply hub outputting the day light image to said video display monitor;

said switch panel providing a means to display said image in a day light environment and said image in a low light environment separately on a video display monitor by switching between said images using a switch, said switch communicating with said switch panel.

* * * * *